US012603914B2

(12) United States Patent
Keen et al.

(10) Patent No.: US 12,603,914 B2
(45) Date of Patent: Apr. 14, 2026

(54) CYBERSECURITY GAP IDENTIFICATION USING KNOWLEDGE GRAPHS

(71) Applicant: Arctic Wolf Networks, Inc., Eden Prairie, MN (US)

(72) Inventors: Matthew Wayne Keen, Redmond, WA (US); Kaushik Sarkar, Mississauga (CA); Sylvain Huy Phong Lu, Toronto (CA); Saravana Bhawa Nukala, Milton (CA); Aditya Deepak Mahale, Toronto (CA); Avneet Singh, Niagara Falls (CA); Yuxuan Hu, Richmond Hill (CA); Mallik Imtiaz Hassan, Fredericton (CA); Rubin K C, Toronto (CA)

(73) Assignee: Arctic Wolf Networks, Inc., Eden Prairie, MN (US)

( * ) Notice: Subject to any disclaimer, the term of this patent is extended or adjusted under 35 U.S.C. 154(b) by 107 days.

(21) Appl. No.: 18/809,912

(22) Filed: Aug. 20, 2024

(65) Prior Publication Data

US 2026/0058977 A1     Feb. 26, 2026

(51) Int. Cl.
H04L 9/40 (2022.01)
(52) U.S. Cl.
CPC .............................. H04L 63/1433 (2013.01)
(58) Field of Classification Search
CPC . H04L 63/1433; H04L 63/1408; H04L 63/20; H04L 63/1441; H04L 43/06; G06F 21/577; G06F 2221/034; G06F 21/55; G06F 21/56; G06F 2221/032; G06F 11/34; G06N 20/00; G06N 5/022; G06N 3/09; G06N 5/04; G06N 3/08
See application file for complete search history.

(56) References Cited

U.S. PATENT DOCUMENTS

2022/0329630 A1* 10/2022 Li ........................... G06F 21/577
2023/0300161 A1* 9/2023 Jenks .................. H04L 63/1425
2024/0144136 A1* 5/2024 Singh ....................... G06N 5/02

OTHER PUBLICATIONS

Choi, Seungoh et al., "Probabilistic Attack Sequence Generation and Execution Based on Mitre Att&ck for ICS Datasets", CSET '21, Virtual, CA, USA, Aug. 9, 2021, 8 pages.

* cited by examiner

*Primary Examiner* — Wasika Nipa
*Assistant Examiner* — Edgar W Xie
(74) *Attorney, Agent, or Firm* — Barnes & Thornburg LLP

(57) ABSTRACT

Disclosed are systems for detecting gaps in security measures performed in a network security environment. A system can: receive prevention data from a prevention system that generates and provides prevention measures to a third party system in a network security environment to prevent potential vulnerabilities, receive detection data from a detection system that generates and provides detection measures to the third party system to block the potential vulnerabilities, receive a framework taxonomy that includes relationships between vulnerabilities, tactics, techniques, and sub-techniques, and generate a knowledge graph based on mapping the prevention data, the detection data, and the tactics, techniques, and sub-techniques of the framework taxonomy. The system can also traverse the knowledge graph, iteratively detect gaps in the prevention measures or the detection measures based on traversing the knowledge graph, and return information about the detected gaps.

13 Claims, 10 Drawing Sheets

300

From Security
Framework

From Detection System

From Prevention System

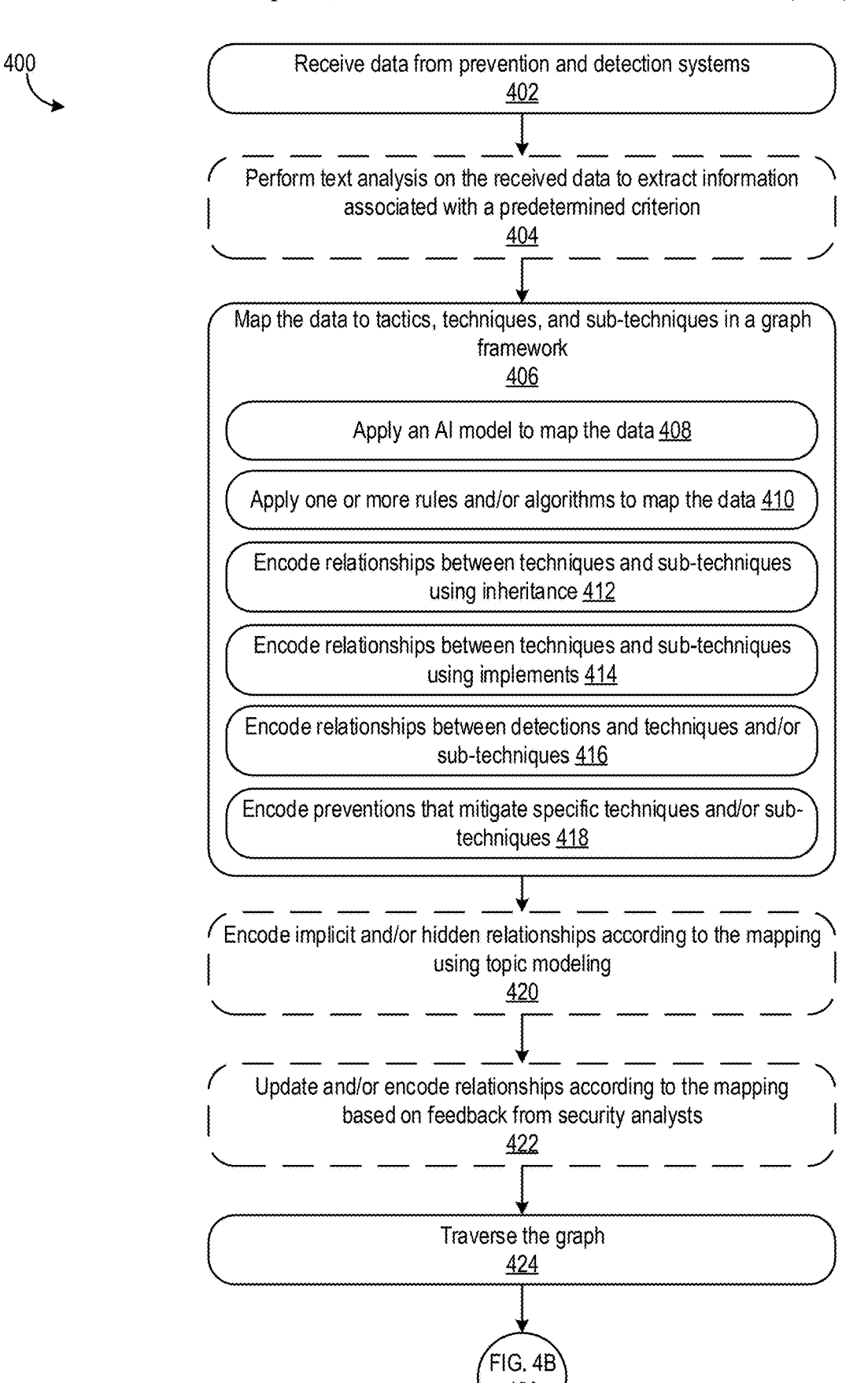

400

Receive data from prevention and detection systems
402

Perform text analysis on the received data to extract information associated with a predetermined criterion
404

Map the data to tactics, techniques, and sub-techniques in a graph framework
406

Apply an AI model to map the data 408

Apply one or more rules and/or algorithms to map the data 410

Encode relationships between techniques and sub-techniques using inheritance 412

Encode relationships between techniques and sub-techniques using implements 414

Encode relationships between detections and techniques and/or sub-techniques 416

Encode preventions that mitigate specific techniques and/or sub-techniques 418

Encode implicit and/or hidden relationships according to the mapping using topic modeling
420

Update and/or encode relationships according to the mapping based on feedback from security analysts
422

Traverse the graph
424

FIG. 4A
424

Iteratively determine sufficiency of detection and/or prevention coverage based on the traversal
426

Determine probability of chance that a malicious actor transitions between tactics in the graph (refer to FIG. 5) 428

Predict where in the graph the malicious actor may end up based on the probability of chance 430

Generate counts between node connections to quantify detections and/or preventions for a corresponding technique and/or sub-technique 432

Identify opportunities for improving detection and/or prevention measures based on the sufficiency of coverage, the probability of chance, and/or the prediction(s)
434

Identify an opportunity for improvement of a particular detection and/or prevention having a count value that satisfies one or more improvement criteria 436

Weight count values for the detections and/or preventions in the graph using one or more predetermined weighting factors 438

Rank the detections and/or preventions using a prioritization criterion 440

Select a subset of the detections and/or preventions having weighted count values that satisfy one or more improvement criteria 442

Generate output indicating the opportunities for improvement
444

Return the output
446

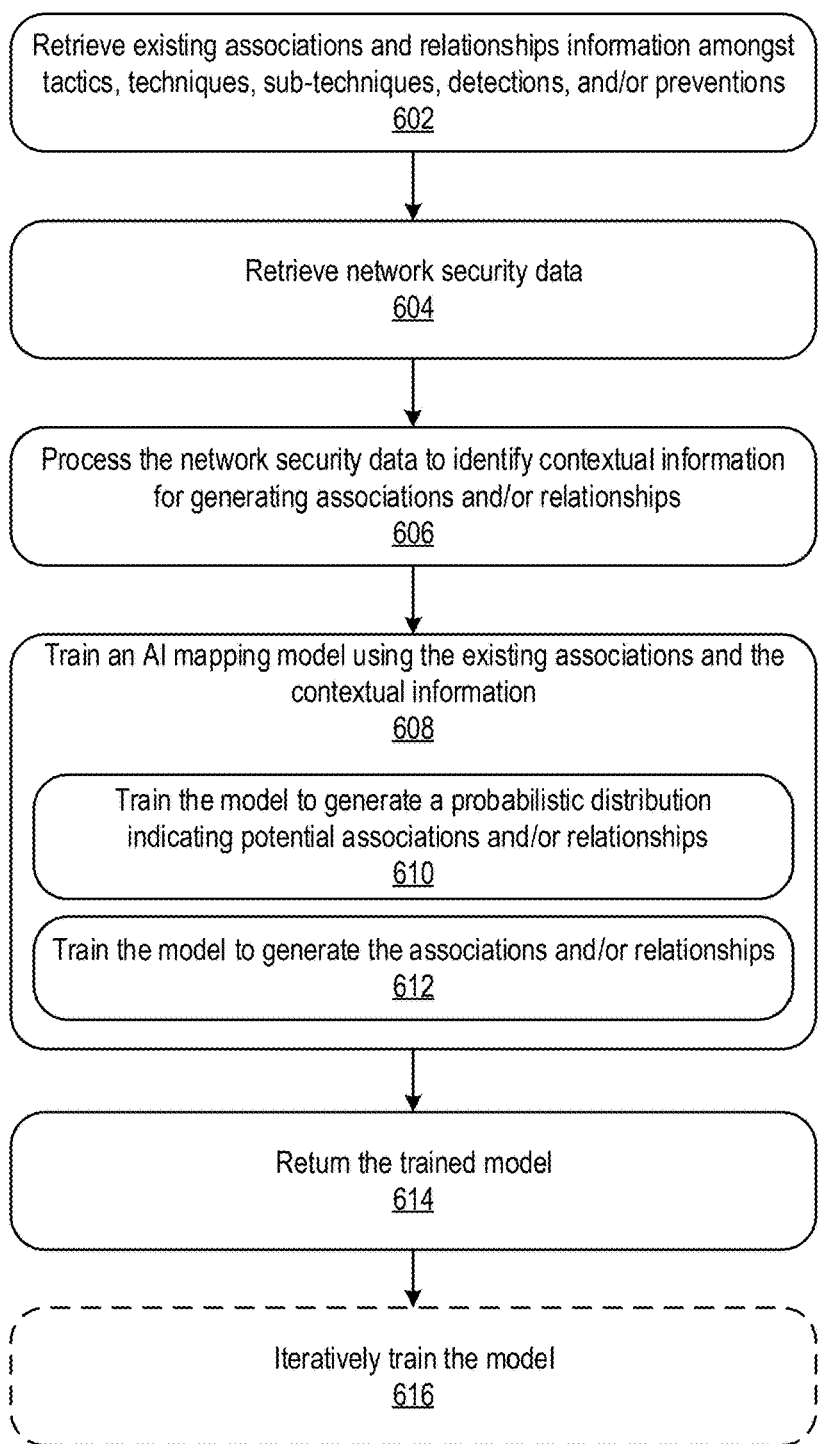

Retrieve existing associations and relationships information amongst tactics, techniques, sub-techniques, detections, and/or preventions
602

Retrieve network security data
604

Process the network security data to identify contextual information for generating associations and/or relationships
606

Train an AI mapping model using the existing associations and the contextual information
608

Train the model to generate a probabilistic distribution indicating potential associations and/or relationships
610

Train the model to generate the associations and/or relationships
612

Return the trained model
614

Iteratively train the model
616

FIG. 6

CYBERSECURITY GAP IDENTIFICATION USING KNOWLEDGE GRAPHS

TECHNICAL FIELD

This disclosure generally describes devices, systems, methods, and technology related to computer-automated encoding, in a graph schema, tactics, techniques, and sub-techniques of a cybersecurity framework, which can include prevention measures, detection measures, and remediation measures, to identify gaps within the protections provided by the cybersecurity platform.

BACKGROUND

Real-world cybersecurity threat landscapes, as well as user environments, may evolve over time. New vulnerabilities emerge as internet of things (IoT), cloud computing, and/or AI present new attack vectors that bad actors may exploit. With greater complexity and interconnectivity of devices and systems, an attack surface expands, providing potential opportunities for cyber exploitation. Moreover, cyber attackers may continuously improve and automate their tactics, techniques, and procedures (TTPs) by using techniques such as AI and/or machine learning (ML). Such advanced tools can make such cybersecurity attacks challenging to detect, mitigate, and/or resolve.

The constant change can make it challenging to evaluate usefulness and value of remedial investigations as they are scaled to address cybersecurity threats and meet the needs of the user environments. As a result, investigations of cybersecurity incidents may be inconsistent and/or inadequate to resolve threats posed by those incidents. One or more network security frameworks (e.g., cybersecurity frameworks such as MITRE ATT&CK) can provide structured ways to understand and categorize the TTPs that malicious actors may use when conducting cyber attacks. Tactics may include goals that an adversary may seek to achieve during an attack, such as initial access, execution, persistence, privilege escalation, defense evasion, credential access, discovery, and/or lateral movement. The techniques may include specific methods and/or actions used by adversaries to achieve their tactical objectives, including but not limited to command-line interface, script execution, etc. Although the network security frameworks may be used to understand behaviors and techniques employed by adversaries and/or evaluate a user environment's defensive capabilities against the techniques, such network security frameworks can make it challenging to identify gaps in measures taken to secure an environment against ever-changing cybersecurity threats and attacks.

SUMMARY

The disclosure generally describes technology for identifying gaps in detection and/or prevention (e.g., response) measures in a cybersecurity framework using graph schemas. More particularly, the disclosed technology can provide for encoding tactics, techniques, and sub-techniques of a network security framework, prevention measures, detection measures, and remediation measures with a knowledge graph schema. Such data can be stitched together from multiple data sources in a network security environment, such as by a cybersecurity platform, to gain insight into activities of the network security environment, such as prevention data from cybersecurity prevention systems that are configured to harden a network against cybersecurity attacks and detection data from cybersecurity detection systems that are configured to detect cybersecurity attacks that are or have occurred within a network (e.g. user network). The data from these sources may not be readily combinable. As an illustrative example, attack vectors and a framework within which the prevention and detection measures are generated may be different from each other. The disclosed technology includes mechanisms to map the data from the different sources, such as prevention data and detection data, into a common threat domain that can permit for gaps to be identified, quantified, and qualitatively assessed, further permitting for not only gap identification but also gap prioritization. As a result of gap identification and prioritization, more significant security gaps can be prioritized over less significant security gaps. A variety of data structures can be used, as well, to assess risks for gaps that may exist for the network, such as a knowledge graph that models relationships between cybersecurity exploits/attacks as well as the likelihood of threat actors migrating their attack efforts from one exploit to another.

For example, the disclosed technology can be used to generate an understanding of holistic coverage across the network security environment. The disclosed technology may also be used to generate insights into day-to-day activities of the network security environment. The disclosed technology may additionally or alternatively be used to automatically answer one or more queries regarding detections, preventions, tactics, techniques, and/or sub-techniques. As merely illustrative examples, prevention measures that may be queried to mitigate later-movement techniques can include, but are not limited to: implementing and managing firewalls on end user devices, performing traffic filtering between network segments, remediating penetration test findings, enforcing automatic device lockout on portable end user devices, establishing and maintaining secure configuration processes, managing default accounts on enterprise assets and software, uninstalling or disabling unnecessary services on enterprise assets and software, establishing an access granting process, establishing an access revoking process, and/or defining and maintaining role-based access control.

In the network security environment, prevention measures can be determined, updated, and performed to make a network less vulnerable to cyber-attacks. Detection measures may also be determined, updated, and performed within the environment to block network traffic from particular geographical regions, network ports, and/or other sources and thus secure the network against such cyber-attacks. Using the disclosed technology, a knowledge graph can be constructed in which tactics, techniques, and/or sub-techniques are encoded with the prevention measures and the detection measures. The graph can be automatically traversed to identify gaps in one or more of the prevention, the detection measures, and the remediation measures, where more prevention, detection, and/or remediation measures may be needed. Any of the disclosed technology (e.g., generating the graph, traversing the graph, identifying gaps in the measures based on the traversal) can be performed using machine learning (ML) models and/or other types of artificial intelligence (AI) models.

Although the disclosed technology is described from the perspective of mapping prevention and detection measures, the disclosed technology may also be used to map additional or other measures, including but not limited to remediation, counter-remediation, and/or recovery measures in the network security environment. As an illustrative example, the disclosed technology can be used to identify relationships and gaps between detection, prevention (e.g., remediation), and recovery measures in the network security environment.

One or more embodiments described herein can include a system for detecting gaps in cybersecurity measures performed in a network security environment, the system including: a cybersecurity prevention system programmed to generate and provide prevention measures to a third party system in a network security environment, the prevention measures including configuration settings that, when implemented at the third party system, cause the third party system to prevent potential cybersecurity vulnerabilities, a cybersecurity detection system programmed to generate and provide detection measures to the third party system in the network security environment, the detection measures including rules that can be triggered, by the third party system, in response to detecting and blocking the potential cybersecurity vulnerabilities, a mapping engine programmed to: receive prevention data from the cybersecurity prevention system, receive detection data from the cybersecurity detection system, receive a framework taxonomy from a cybersecurity framework, the framework taxonomy including relationships between cybersecurity vulnerabilities, tactics, techniques, and sub-techniques, and generate a knowledge graph based on mapping the prevention data, the detection data, and the tactics, techniques, and sub-techniques of the framework taxonomy, and a gap detection engine programmed to: receive the knowledge graph from the mapping engine, traverse the knowledge graph, iteratively detect gaps in the prevention measures or the detection measures based on traversing the knowledge graph, and return information about the detected gaps.

In some implementations, the embodiments described herein can optionally include one or more of the following features. For example, generating the knowledge graph can be further based on applying a trained artificial intelligence (AI) model to the prevention data, the detection data, and the framework taxonomy. The AI model could have been trained to correlate the prevention data and the detection data with the tactics, techniques, and sub-techniques according to the framework taxonomy. Detecting the gaps can be further based on applying a trained AI model to the knowledge graph. Detecting the gaps can include determining a sufficiency of coverage for the prevention measures or the detection measures against the potential cybersecurity vulnerabilities. Determining the sufficiency of coverage can include generating a count value for connections between nodes in the knowledge graph and based on traversing the knowledge graph to quantify the detection measures and the prevention measures for the corresponding techniques or sub-techniques. The nodes in the knowledge graph can indicate the tactics, techniques, and the sub-techniques. The gap detection engine can be further programmed to identify a particular prevention measure or a particular detection measure for improvement based on the respective count value satisfying one or more improvement criteria. The gap detection engine can be further programmed to weight the count values using one or more predetermined weighting factors. The gap detection engine can be further programmed to: rank the detection measures and the prevention measures according to the weighted count values, select a subset of the ranked detection measures and the prevention measures having the weighted count values that satisfy one or more improvement criteria, and return information about the selected subset of the ranked detection measures and the prevention measures as opportunities for improvement.

As another example, detecting the gaps can include determining a probability of chance that a malicious actor would transition between the tactics, techniques, or sub-techniques of the knowledge graph. The gap detection engine can be further programmed to predict where, in the knowledge graph, the malicious actor is likely to end up based on the probability of chance. Returning the information about the detected gaps can include identifying an opportunity for improving at least one of the prevention measures or the detection measures corresponding to the detected gaps that satisfy one or more improvement criteria.

Generating the knowledge graph can include encoding relationships between the techniques and sub-techniques using an inheritance schema. Generating the knowledge graph can include encoding relationships between the techniques and the sub-techniques using an implements schema. Generating the knowledge graph can include encoding relationships between the detection measures and the techniques or the sub-techniques. Generating the knowledge graph can include encoding relationships between the prevention measures and the techniques or the sub-techniques that the respective prevention measures mitigate. Sometimes, traversing the knowledge graph can include: selecting a starting node in the knowledge graph and recursively traversing through edges of the knowledge graph between nodes, wherein the traversal begins at the starting node.

One or more embodiments described herein can include a system for detecting gaps in security measures performed in a network security environment, the system including: a mapping engine programmed to: receive prevention data from a prevention system that can be programmed to generate and provide prevention measures to a third party system in a network security environment to prevent potential vulnerabilities, receive detection data from a detection system that can be programmed to generate and provide detection measures to the third party system in the network security environment to block the potential vulnerabilities, receive a framework taxonomy, the framework taxonomy including relationships between vulnerabilities, tactics, techniques, and sub-techniques, and generate a knowledge graph based on mapping the prevention data, the detection data, and the tactics, techniques, and sub-techniques of the framework taxonomy. The system can also include a gap detection engine programmed to: receive the knowledge graph from the mapping engine, traverse the knowledge graph, iteratively detect gaps in the prevention measures or the detection measures based on traversing the knowledge graph, and return information about the detected gaps.

The system can optionally include one or more of the abovementioned features and/or one or more of the following features. For example, generating the knowledge graph can include encoding relationships between the techniques and sub-techniques using an inheritance schema. Generating the knowledge graph can include encoding relationships between the techniques and the sub-techniques using an implements schema. Generating the knowledge graph can include encoding relationships between the detection measures and the techniques or the sub-techniques. Sometimes, generating the knowledge graph can include encoding relationships between the prevention measures and the techniques or the sub-techniques that the respective prevention measures mitigate.

In some implementations, detecting the gaps can include determining a probability of chance that a malicious actor would transition between the tactics, techniques, or sub-techniques of the knowledge graph. Detecting the gaps can include determining a sufficiency of coverage for the prevention measures or the detection measures against the potential cybersecurity vulnerabilities. Determining the sufficiency of coverage can include generating a weighted count value for connections between nodes in the knowledge graph and based on traversing the knowledge graph. Traversing the knowledge graph can include: selecting a starting node in the knowledge graph, and recursively traversing through edges of the knowledge graph between nodes, wherein the traversal begins at the starting node.

One or more embodiments described herein can include a system for detecting gaps in security measures performed in a network security environment, the system including: a gap detection engine programmed to: receive a knowledge graph including a mapping of prevention measures, detection measures, and tactics, techniques, and sub-techniques of a cybersecurity framework taxonomy, traverse the knowledge graph, iteratively detect gaps in the prevention measures or the detection measures based on traversing the knowledge graph, and return information about the detected gaps.

The system can optionally include one or more of the abovementioned features and/or one or more of the following features. For example, detecting the gaps can include determining a probability of chance that a malicious actor would transition between the tactics, techniques, or sub-techniques of the knowledge graph. Detecting the gaps can include determining a sufficiency of coverage for the prevention measures or the detection measures against potential cybersecurity vulnerabilities. Determining the sufficiency of coverage can include generating a weighted count value for connections between nodes in the knowledge graph and based on traversing the knowledge graph. Traversing the knowledge graph can include: selecting a starting node in the knowledge graph and recursively traversing through edges of the knowledge graph between nodes, wherein the traversal begins at the starting node.

The devices, system, and techniques described herein may provide one or more of the following advantages. For example, the disclosed technology can be used to minimize exposure within a network security environment by automatically mapping network security measures (such as prevention and/or detection measures) to tactics, techniques, and/or sub-techniques of a network security framework (such as MITRE ATT&CK framework or other cybersecurity framework). A knowledge graph, for example, can be used to coordinate information across different systems to easily and accurately identify correlations between the different detection and/or prevention measures.

The disclosed technology can further provide greater understanding of how identification and prevention measures (and other similar measures) compliment detection, response, and/or recovery measures (or other similar measures) to provide improved network security to a user environment. Accordingly, the disclosed technology provides for a risk context framework, which can enhance efforts to identify gaps and improve the network security.

As another example, the disclosed technology simplifies identification of risk and network security gaps by using an automated knowledge graph schema. There is a complex many to many relationship between risks and detections or other security measures, which can be simplified and visualized using the graph schema(s) described herein.

To provide robust and accurate detection of gaps in various network security measures, the disclosed technology can use a complex collection of algorithms, techniques, and/or models to analyze data related to one or more parameters, such as prevention measures and detection measures, for a particular network security environment to inform users associated with the environment of parameters that may be inadequate or in need of updating. This complex collection of algorithms, techniques, and/or models can provide an unconventional solution to the problem of trying to identify how different types of security measures interact with each other to provide network security that keeps up with ever-changing cyber-attacks. This unconventional solution can be rooted in technology and provides information, such as mappings and correlations, that was not available in conventional systems. This solution also represents an improvement in the subject technical field otherwise unrealized by conventional systems. Specifically, the disclosed technology can automatically correlate the different security measures with each other and tactics, techniques, and/or sub-techniques of a network security framework to glean insight into gaps in those security measures and appropriate remediation to improve or otherwise resolve those gaps.

The disclosed technology may automatically process complex, disparate datatypes and boil it down to a comprehensible, easy-to-understand graph schema, such as a knowledge graph. Relationships between different prevention and detection measures and tactics, techniques, and/or sub-techniques of a network security framework can be easily visualized to glean insight into gaps and needs for updating or remediation. The disclosed technology similarly may provide automated techniques for predicting attack sequences of malicious actors or adversaries using the graph schema to improve overall network security.

By using knowledge graphs, the disclosed technology can provide for correlating multiple different frameworks in convert to further refine connections between prevention, detection, and/or remediation coverage. An illustrative example can include the use of a compliance framework, such as a Center for Internet Security (CIS) mapping and/or a National Institute of Standards and Technology (NIST) mapping. These subgraphs can be walked from the CIS edges and the NIST edges to identify controls that are likely the same if there is a path from node to node in both subgraphs. Accordingly, these different frameworks can be correlated using the disclosed knowledge graph techniques.

The details of one or more implementations are set forth in the accompanying drawings and the description below. Other features and advantages will be apparent from the description and drawings, and from the claims.

BRIEF DESCRIPTION OF THE DRAWINGS

FIGS. 4A and 4B is a flowchart of a process for mapping information related to network security event detection and prevention measures and identifying gaps in one or more of those measures.

FIG. 6 is a flowchart of a process for training an AI model to map information related to network security event detection and prevention measures to a graph, such as a knowledge graph.

In the present disclosure, like-numbered components of various embodiments generally have similar features when those components are of a similar nature and/or serve a similar purpose, unless otherwise noted or otherwise understood by a person skilled in the art.

DETAILED DESCRIPTION OF ILLUSTRATIVE
EMBODIMENTS

This disclosure generally relates to systems, methods, processes, and technology related to automatically mapping and identifying gaps in prevention, detection, and/or other security measures in a network security environment using knowledge graphs. The identified gaps can be prioritized and addressed to improve overall security for a network of devices, an enterprise, an organization, etc. The graph can be assembled to demonstrate how prevention and detection measures work together in the network security environment and in light of a network security framework, such as MITRE ATT&CK framework or other cybersecurity frameworks. Such mapping in the graph can be used to accurately and automatically identify gaps between the different types of measures.

Although this disclosure describes using the disclosed technology to identify gaps in prevention and/or detection measures, this is merely an illustrative example. The disclosed technology can be used to identify gaps in a variety of other security measures or combinations of multiple security measures, including but not limited to identification measures, remediation measures, counter-remediation measures, and/or recovery measures. The disclosed technology can also use one or more different network security frameworks, including but not limited to MITRE ATT&CK framework as merely one illustrative example.

Figure 1A:
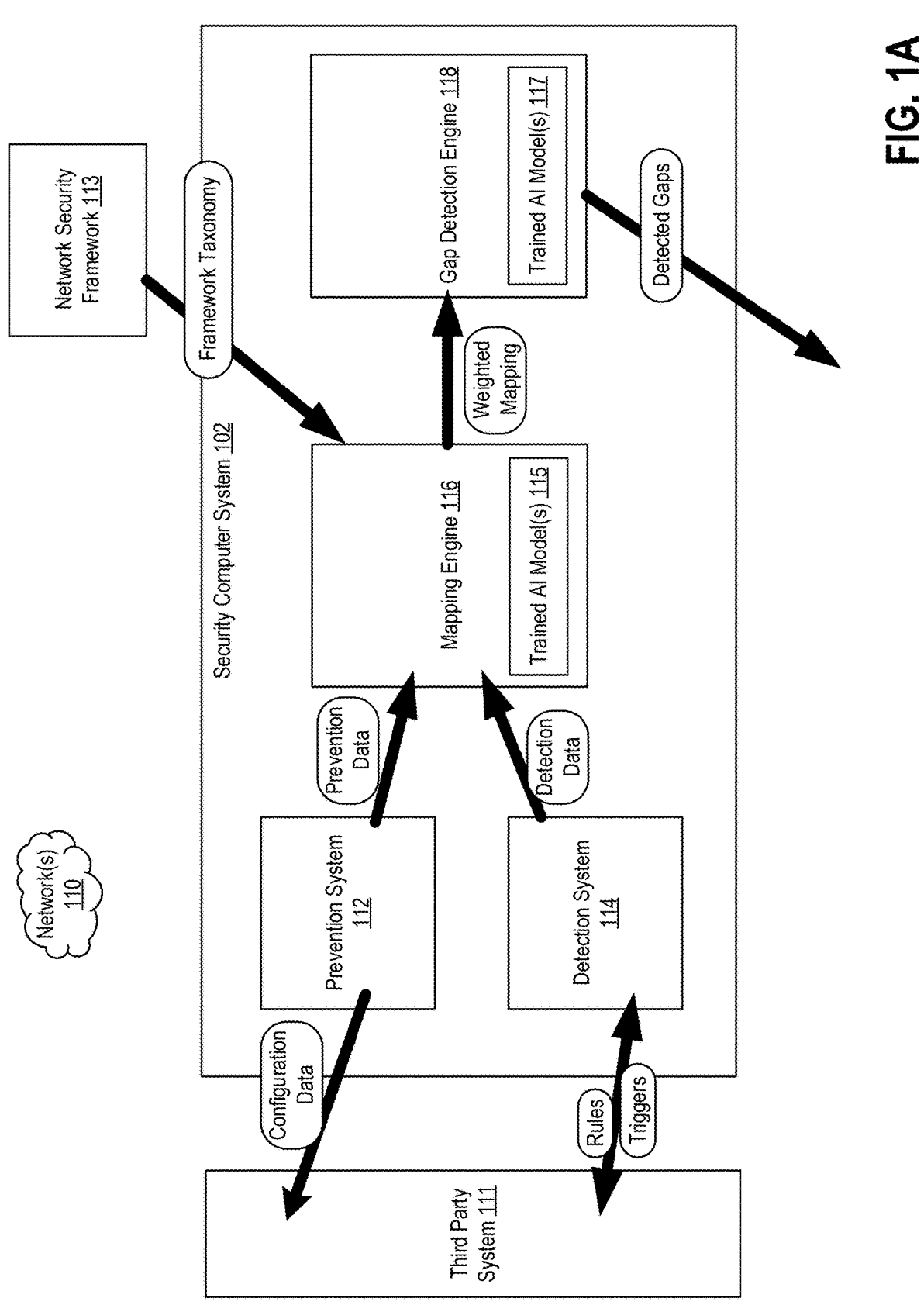
FIG. 1A illustrates an example security computer system that can perform data mapping and analysis to identify gaps in network security detection and/or prevention measures.
Figure 7:
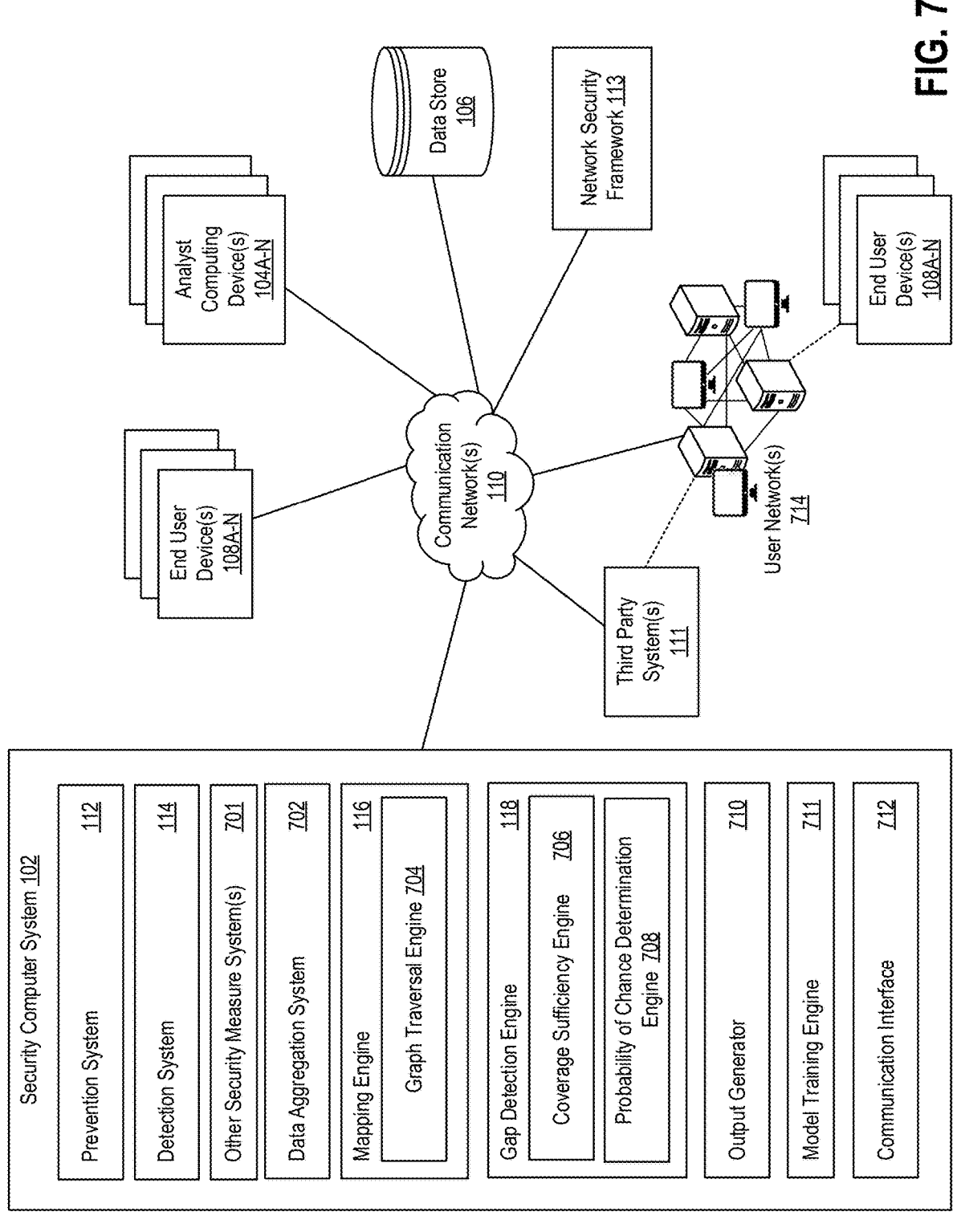
FIG. 7 is a system diagram of one or more components that can be used to perform the disclosed technology.

Referring to the figures, FIG. 1A illustrates an example security computer system 102 that can communicate via network(s) 110 with at least a third party system 111 and a network security framework 113 (e.g., cybersecurity framework). The security computer system 102 can be a cybersecurity platform that is programmed and configured to perform data mapping and analysis to identify gaps in network security detection and/or prevention measures. The security computer system 102 can include one or more components that are programmed to perform the disclosed techniques. Refer to FIG. 7 for further discussion about the components of the security computer system 102. The third party system 111 can be associated with a user network, user computing devices, or other computing systems that receive network security measures from the security computer system 102. For example, the third party system 111 can include a system in a user network that provides and performs network security operations based on data, rules, settings, and/or configurations received from the security computer system 102. In some implementations, the third party system 111 can include any of the user network, the user computing devices, or other secured networks/systems described herein. The network security framework 113 can be programmed and configured to provide a framework for network security, such as a MITRE ATT&CK framework. The framework 113 can provide a taxonomy of various different attack variables that are defined by tactics, techniques, and sub-techniques.

The security computer system 102 can include a prevention system 112, a detection system 114, a mapping engine 116, and/or a gap detection engine 118. The prevention system 112 can be programmed to perform one or more prevention measures to secure an environment, such as a user network, an enterprise, and/or an organization that is associated with the third party system 111. For example, the prevention system 112 can be programmed to provide configuration data to the third party system 111, the configuration data including settings, configurations, firewalls, and other measures. The third party system 111 can receive the configuration data and implement the settings, configurations, firewalls, and/or other measures locally, and according to the configuration data, to prevent malicious attacks or other vulnerabilities. Example prevention measures may include, but are not limited to, implementation of firewalls, monitoring of network traffic, implementing access control mechanisms, encrypting data in transit and/or at rest, applying patches and updates to operating systems, applications, and/or network devices, dividing a network into segments with different security levels, securing endpoints with anti-virus software, detection and response tools, and/or enforcing security policies, keeping logs of network activities and monitoring them for unusual behavior, and/or regularly backing up (and potentially recovering) data in the user environment. The prevention system 112 can generate prevention data such as configuration and policy data, audit logs, compliance data, access control data, security events data, patch management and vulnerability data, encryption and key management data, configuration compliance reports, training and awareness data, and/or incident prevention metrics, all of which can be transmitted to the mapping engine 116 as the prevention data.

The detection system 114 can be programmed to perform one or more detection measures to secure the environment, or the third party system 111. For example, the detection system 114 can generate and provide detection and/or blocking rules to the third party system 111. The third party system 111 can locally execute those rules in order to block malware, malicious attacks, or other vulnerabilities at the third party system 111. The third party system 111 can provide triggers and other data back to the detection system 114, the triggers indicating which rules were triggered/executed to block the detected vulnerabilities in the environment/at the third party system 111. The third party system 111 may provide updates to the detection system 114 whenever one or more of the rules are triggered/executed. The detection system 114 can process the triggers data received from the third party system 111 to generate detection data. The detection data can then be provided by the detection system 114 to the mapping engine 116. The detection data can include, but is not limited to, alerts, alarms, logs, events data, incident reports, forensic data, anomaly detection data, correlation data, security intelligence information, indication of which rules were running, which rules were triggered, and/or compliance and audit trails.

Example detection measures that can be provided by the detection system 114 and triggered at the third party system 111 may include, but are not limited to, monitoring network traffic and blocking network traffic, generating alerts when suspicious activity is detected, collecting and analyzing logs to detect and stop unusual activity, inspecting packets, deploying honeypots, conducting vulnerability assessments, and/or assessing user and entity behaviors. Various other measures can also be deployed at the third party system 111 according to the rules generated by the detection system 114.

The mapping engine 116 can be programmed and configured to receive the data generated by and from the prevention system 112 and/or the detection system 114 to then automatically generate weighted mappings using the data. The mapping engine 116 can execute one or more trained AI models 115 to generate the weighted mapping. Refer to at least FIG. 6 for further discussion about training the model(s) 115. Generating the mappings can include encoding the data about the prevention measures reported in the prevention data and the detection measures reported in the prevention data with tactics, techniques, and/or sub-techniques that can be provided in a framework taxonomy from the network security framework 113. The framework taxonomy can include, for example, genus attack variables with related species of attack variables, which can provide an inherent mapping and/or organization of different attack types and/or possible attack sequences. The mapping can be a knowledge graph, described further herein. The knowledge graph is merely an illustrative example. Other types of networks or mappings may be used with the disclosed technologies. As an illustrative example, a Markov Chain can be constructed as a mapping using the same techniques described herein. The mapping can also be weighted according to one or more different factors and/or criteria, as described further in reference to FIGS. 4A and 4B. For example, the mapping can be weighted by user feedback related to effectiveness of controls (e.g., whether or not the controls solved a particular vulnerability). This weighting can therefore provide a recommendation of which prevention measures should be mitigated first. The mapping, as another example, can be weighted by detection measures scan effectiveness (e.g., whether a detection was made of a vulnerability of high veracity). And of the weights applied and described herein can be used as a recommendation to choose or otherwise determine which control of measure to apply. The weighted mapping can be provided by the mapping engine 116 to the gap detection engine 118.

The gap detection engine 118 can be programmed and configured to perform one or more processing operations using the weighted mapping to detect and output gaps in the prevention and detection measures. For example, the gap detection engine 118 can traverse the graph of the weighted mapping to detect gaps in the prevention and/or detection measures that are reported in the prevention data and/or the detection data, respectively. In some implementations, the gap detection engine 118 can detect the gaps in the measures based on applying one or more trained AI model(s) 117. The AI model(s) can be trained to perform clustering techniques and/or topic modeling to detect the gaps. In some implementations, the AI model(s) can include a Bayesian network and/or Bayesian topic model (e.g., latent Dirichlet allocation).

The gap detection engine 118 can additionally or alternatively traverse the graph to determine probabilities of chance that one or more tactics, techniques, and/or sub-techniques may be performed. The gap detection engine 118 can additionally or alternatively traverse the graph to determine probabilities that particular actions may be performed by malicious actors within attack sequences. Any of these determinations may be used by the gap detection engine 118 to determine whether and what prevention measures and/or detection measures can be improved and/or created. Any of these determinations may also be performed by using the trained AI model(s) 117. Refer to at least FIGS. 4A, 4B, and 5 for further discussion about the operations performed by the gap detection engine 118. The detected gaps can then be outputted by the gap detection engine 118. As described at least in reference to FIG. 1B, information about the detected gaps can be provided to computing devices of relevant users, such as security analysts associated with the security computer system 102, the prevention system 112, and/or the detection system 114. The relevant users can use the information about the detected gaps to improve and/or create prevention and/or detection measures to be executed by the third party system 111.

Figure 1B:
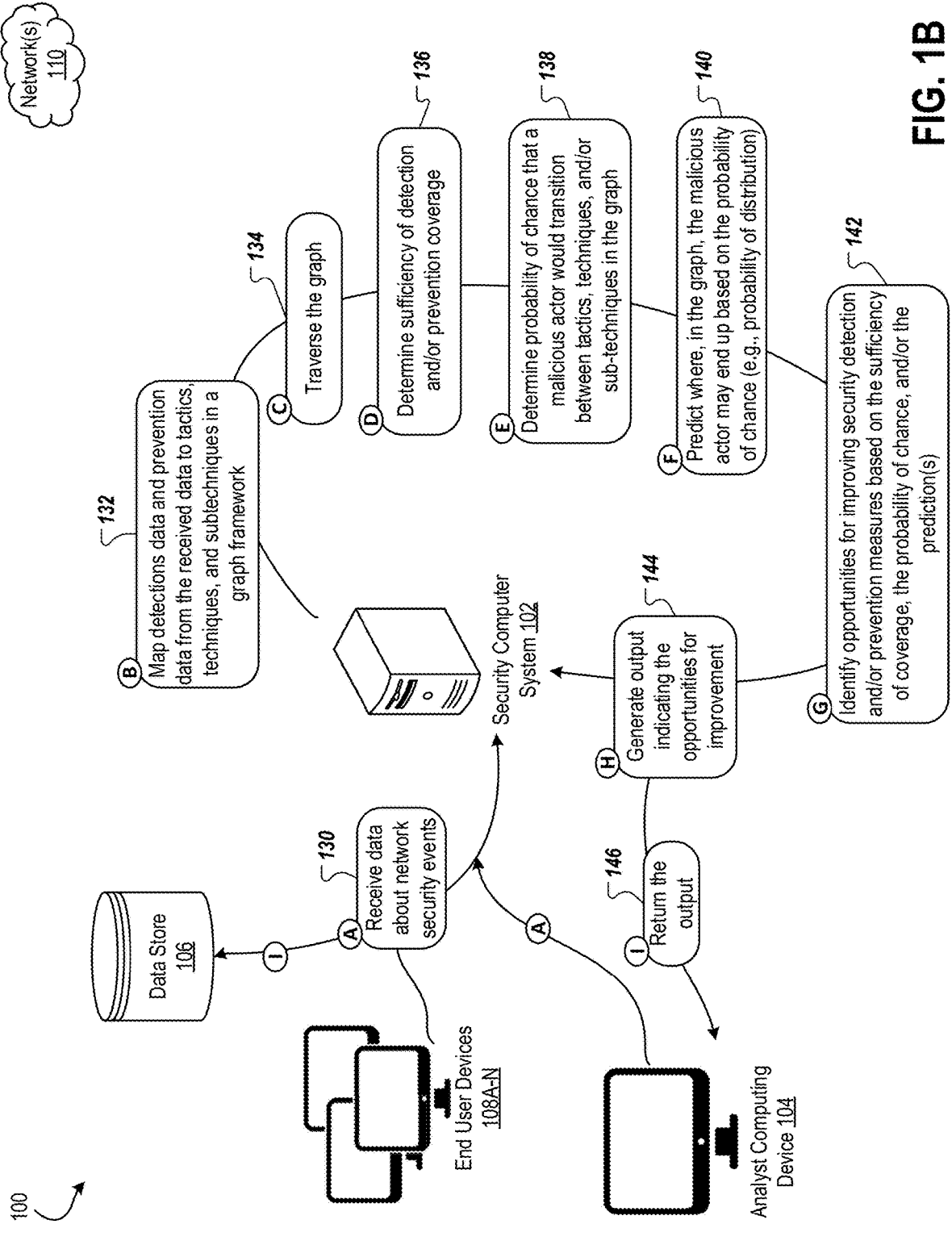
FIG. 1B is a conceptual diagram of a system for mapping information related to network security event detection and prevention measures and identifying gaps in one or more of those measures.

FIG. 1B is a conceptual diagram of a system 100 for mapping information related to network security event detection and prevention measures and identifying gaps in one or more of those measures. In the system 100, the security computer system 102 can communicate (e.g., wired, wireless) over network(s) 110 with an analyst computing device 104, a data store 106, and/or end user devices 108A-N. As described further herein, the end user devices 108A-N can be part of a user environment, such as a user network. Refer to FIG. 7 for further discussion. In brief, the analyst computing device 104 can be used by a security analyst or other relevant users that may interact with the security computer system 102 to analyze network security information, perform one or more security measures, and/or improve one or more of the security measures. The data store 106 can be part of the security computer system 102 or separate, and configured to maintain information and data related to the tracking, detection, and/or response of security events related to the environment in which the end user devices 108A-N operate.

In the system 100, the security computer system 102 can receive data about network security events in block A (130). As described in reference to FIG. 1A, the data can be generated by the prevention system 112 and/or the detection system 114 of the security computer system 102. Such data can be stored in the data store 106 and then retrieved by the security computer system 102 in block A (130). In some implementations, some of the data can be received from the end user devices 108A-N and/or the analyst computing devices 104. As an illustrative example, the data received from the end user devices 108A-N can include data about access controls, logs, network events, blocked traffic, firewalls, etc. that may be recorded and/or generated directly at the devices 108A-N in the user environment. As another illustrative example, the data received from the analyst computing device 104 may include user input about one or more security measures that were performed, executed, and/or updated/modified in response to activities that were detected in the user environment by potentially malicious actors or adversaries. Refer to FIG. 1A for further discussion about the data received in block A (130).

Using the received data, the security computer system 102 can map detections data and prevention data to tactics, techniques, and/or sub-techniques in a graph framework (block B, 132). As described herein, the security computer system 102 can encode the data with the tactics, techniques, and/or sub-techniques in a knowledge graph schema or framework taxonomy. This mapping/encoding can be performed using AI and/or ML models, in some implementations. Refer to at least FIGS. 4A and 4B for further discussion. Refer to FIG. 1A for further discussion about the knowledge graph schema or the framework taxonomy.

The security computer system 102 can traverse the graph in block C (134). Traversing the graph can include walking through nodes of the graph, the nodes of the graph representing security controls. Traversing the graph can allow for building relationships and understanding correlations between different measures. The relationships can illustrate effectiveness of the nodes (e.g., security controls, security measures) against different malicious actors, adversaries, and/or threat actors. Traversing the graph can be performed to identify what security measures to prioritize.

The security computer system 102 can determine sufficiency of detection and/or prevention coverage in block D (136) according to the graph traversal. Walking the graph from every node can allow for determining counts between inner-connections of nodes and tactics, techniques, and/or sub-techniques and then using those counts to determine how much coverage exists in the prevention measures and/or the detection measures for particular tactics, techniques, and/or sub-techniques. Using the counts, the detection and/or the prevention measures can be prioritized and ranked to determine which should be addressed. Threshold values can be used to determine whether and which measures are appropriate and/or which ones should be addressed. Sometimes, for example, measures that exceed the respective threshold value(s) can be flagged and sent in a notification, push notification, or other message to the analyst computing device 104 so that countermeasures can be established and put in place.

Figure 5:
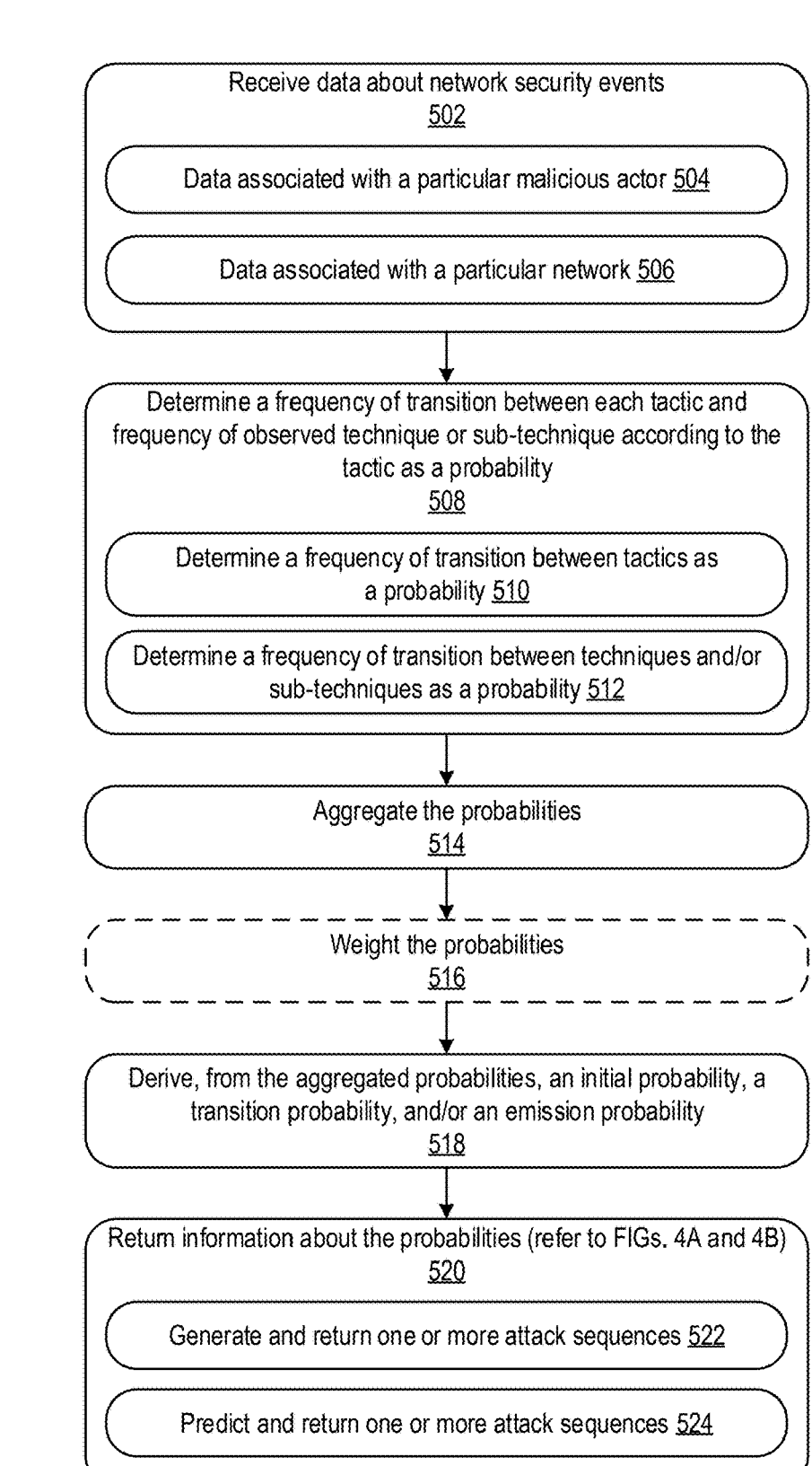
FIG. 5 is a flowchart of a process for determining a probability of chance that a malicious actor may perform one or more attack sequences.

The security computer system 102 can also determine probability of chance that a malicious actor would transition between tactics, techniques, and/or sub-techniques in the graph (block E, 138). In some implementations, counts and other empirical data can be used to figure out how threat attacks morph over different tactics, techniques, and/or sub-techniques. After all, a malicious actor can modify their attacks once they are exploited by the security computer system 102. The probability of chance can indicate a likelihood that the actor moves from one tactic to another or transitions between techniques or sub-techniques after a particular tactic, technique, or sub-technique. Refer to FIG. 5 for further discussion.

Accordingly, the security computer system 102 can predict where, in the graph, the malicious actor may end up in an attack sequence based on the probability of chance (e.g., probability of distribution) (block F, 140). Refer to FIG. 5 for further discussion.

The security computer system 102 can identify opportunities for improving security detection and/or prevention measures based on the sufficiency of coverage, the probability of chance, and/or the prediction(s) in block G (142). In other words, the system 102 can identify gaps in the detection measures, the prevention measures, or a combination thereof that are allowing the malicious actor to pass through the network of end user devices 108A-N or follow different attack sequences. Refer to FIGS. 4A, 4B, and 5 for further discussion.

In block H (144), the security computer system 102 can generate output indicating the opportunities for improvement. The output can include one or more graphical user interface (GUI) displays to be presented at the analyst computing device 104. The output can include information about the opportunities of improvement that were identified, particular measures that are associated with the opportunities, and/or recommendations about the improvement(s) that can be made. Various other output may also be generated. In some implementations, the output can include selectable options to select one or more recommendations regarding which controls or measures to apply. The recommendations can be generated by the security computer system 102 based on identifying overlap of coverage amongst the controls or measures for multiple frameworks using the disclosed techniques. As an illustrative example, if a prevention measure meets two different compliance requirements, then the security computer system 102 can generate a recommendation to mitigate that prevention measure before other measures. Additionally or alternatively, the output can include suggested actions and/or additional automation (e.g., providing a link to cause an update to be made to one or more of the controls or measures). In some implementations, the output can include information about automatically updating any one or more of the controls or measures, including status information about automated upgrades and/or patches made to the controls or measures by the security computer system 102.

The output can be returned to the analyst computing device 104 in block I (146). The output can be presented in one or more GUIs at the device 104. The analyst can interact with the output presented at the device 104 using one or more user inputs and/or selectable features presented in the GUIs. For example, the analyst can modify one or more of the measures corresponding to the opportunities for improvement. The analyst may create one or more new measures corresponding to the opportunities for improvement. The analyst may test one or more of the measures corresponding to the opportunities for improvement. The analyst can perform various other actions in response to the output. As another example, the output can be transmitted to the data store 106 for storage and later retrieval.

The techniques described in reference to FIG. 1B can be performed during one or more different time periods. For example, the techniques can be performed during runtime. The techniques can be performed before runtime. As a result of performing the techniques before runtime, the prevention and/or detection measures can be improved using the disclosed techniques so that during runtime, the measures can be deployed to protect the user environment of the end user devices 108A-N.

Figure 2:
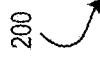
FIG. 2 illustrates an example knowledge graph that maps network security detection and prevention measures to tactics, techniques, and/or sub-techniques using the disclosed technology.

FIG. 2 illustrates an example knowledge graph 200 that maps network security detection and prevention measures to tactics, techniques, and/or sub-techniques using the disclosed technology. The graph 200 illustrates a nested relationship between the tactics, techniques, and sub-techniques, thereby presenting opportunities to automatically identify potential gaps and/or degrees to which those gaps exist. Moreover, the graph 200 illustrates sufficiency of tactics (e.g., probability of chance, probability of distribution) in accomplishing their detection and/or mitigation/prevention objectives with connections between tactic nodes demarcated by "Y% chance" and "X% chance. " Such probability of chance can be determined for different malicious actors, adversaries, or threat actors. For example, for a particular threat actor, if they use example tactic 1, the graph 200 can be generated and traversed using the disclosed technology to determine a probability of chance that the particular threat actor would transition to one or more other tactics, techniques, and/or sub-techniques. As a result, the disclosed graph 200 and the probability of chance can be used to intelligently forecast what attack(s) may be expected from the particular threat actor. Refer to at least FIG. 5 for further discussion about determining the percent of chance for one or more of the tactics, techniques, and/or sub-techniques in the graph 200. Accordingly, the disclosed technology can provide a more nuanced view and indications of whether each instance of the tactics, sub-techniques, and/or techniques are likely to result in a detection and/or prevention.

In the graph 200, attack vectors connect each node, the nodes representing the tactics, techniques, and sub-techniques. The attack vectors can be used as guidance about what security measures to prioritize for updating and/or modification. The graph 200 provides a robust view of relationships and effectiveness of the nodes against different malicious actors, adversaries, or other threat actors. As a merely illustrative example, if a common initial access and lateral movement in a user network is identified, then percentages of chance corresponding to those can be leveraged in a chance of attack (e.g., attack sequence) and scored holistically to identify which vector between nodes may be weakest (and therefore in need of updating or new security measures). The graph 200 also includes edges (e.g., relationships between the nodes), which have properties used for traversing the graph 200 and gleaning insight. As a result, the graph 200 can be traversed from any starting point, including an edge or place where coverage may not exist for a particular threat actor. Probability of chance (e.g., probability of distribution) can be determined for each edge and used to find a lowest probable vector across the graph 200, which may indicate a gap or need for additional or other security measures.

The graph 200 also illustrates example detection measures R-Z within the network security environment, what sub-techniques and/or techniques each of the detection measures R-Z detects, and what tactics may be implemented as a result. Similarly, the graph 200 illustrates example prevention measures A-N within the network security environment, what sub-techniques and/or techniques each of the prevention measures A-N prevents, and what tactics may be implemented as a result. As described herein, different network security measures may be assessed and mapped in the graph 200. The prevention measures A-N can be mapped in the graph 200 to assist in intelligently forecasting potential lateral movement of a malicious actor, adversary, or threat actor once they infiltrate the user network, which in turn can help to automatically identify prevention measures that can be updated, created, and/or put in place.

Figure 3:
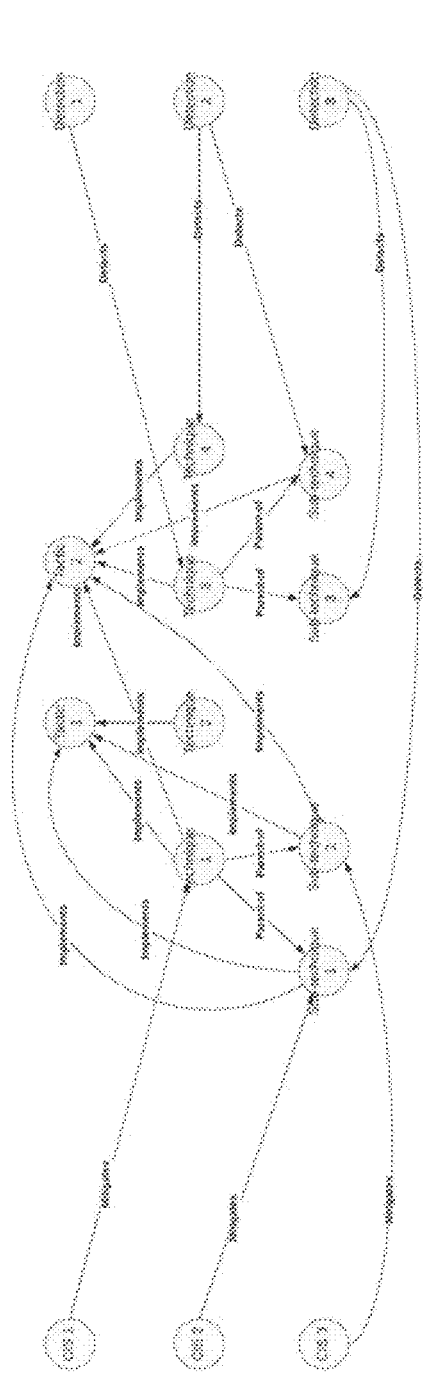
FIG. 3 illustrates another example graph that maps detection information from detection systems and prevention information from prevention systems to tactics, techniques, and/or sub-techniques using the disclosed technology.

FIG. 3 illustrates another example graph 300 that maps detection information as detection nodes from detection systems and prevention information as prevention nodes from prevention systems to tactics, techniques, and/or sub-techniques in a network security framework using the disclosed technology. In the graph 300, the techniques and sub-techniques are encoded with relationships using an inheritance relationship (e.g., parent of). The techniques, sub-techniques, and tactics are also encoded with relationships using an implements relationship. The detection nodes in the graph 300 are encoded with relationships between each detection node that is connected to a technique or sub-technique. The prevention nodes (demarcated as "CIS" 1-3) in the graph 300 are encoded with relationships between the prevention nodes that mitigate specific techniques and/or sub-techniques. The encoding can be performed automatically using the security computer system 102, as described herein.

Encoding the graph 300 as shown in FIG. 3 can allow for this schema to be stitched inherently on the basis of the techniques and sub-techniques of a particular network security framework (e.g., MITRE ATT&CK or other cybersecurity framework). MITRE ATT&CK, for example, is a common framework for cyber threat intelligence. MITRE techniques more generally provide a level of conceptual granularity for discovering overlap between detection and prevention measures. Tactics (one level up in a conceptual hierarchy) may be too coarse-grained (hence a false sense of security) while procedures (one level down) may be too fine-grained, thereby resulting in a lack of data for carrying out the analysis meaningfully. Understanding adversarial techniques and tactics, current adversarial campaigns, and the industry/sector that the adversary is targeting can enable more accurate and curated recommendations. Those recommendations can provide for the most effective and important prevention and detection measures to be implemented or remediated first in light of the understandings that can be gleaned from the ATT&CK framework. As a merely illustrative example, APT FOZZY BEAR is known to use a technique for reconnaissance aimed at the financial industry. Any detection and prevention measures for reconnaissance should be prioritized for any company in the financial industry, which can be determined using the disclosed techniques.

FIGS. 4A and 4B is a flowchart of a process 400 for mapping information related to network security event detection and prevention measures and identifying gaps in one or more of those measures. Although the process 400 is described from the perspective of mapping detection and prevention measures, this is a merely illustrative example. The disclosed techniques can also be performed with other types of security measures in a network security environment, as described herein. In some implementations, for example, the process 400 can be performed to map information related to more than two types of security measures, such as detection measures, prevention measures, and recovery or remediation measures. Any quantity of security measures can be mapped using the process 400 to identify gaps in one or more of those measures and in light of one or more different malicious actors, adversaries, and/or threat actors.

The process 400 can be performed by components of the security computer system 102 (e.g., a cybersecurity platform) that are described in reference to at least FIGS. 1A and 7. The process 400 can also be performed by one or more other software modules, applications, and/or engines that are programmed to perform the disclosed techniques. Such software modules, applications, and/or engines can be implemented by one or more computing systems, devices, computers, networks, cloud-based systems, and/or cloud-based services. For illustrative purposes, the process 400 is described from the perspective of a computer system.

Referring to the process 400 in FIGS. 4A and 4B, the computer system can receive data from prevention and detection systems in block 402. Refer to at least FIG. 1A for further discussion. The computer system may also receive data about current attacks, including but not limited to volumes of the attacks and/or what has been prevented and/or detected.

In block 404, the computer system can optionally perform text analysis on the received data to extract information associated with a predetermined criterion.

The computer system can map the data to tactics, techniques, and/or sub-techniques in a graph framework in block 406. The tactics, techniques, and/or sub-techniques can be received as part of a framework taxonomy from a network security framework (e.g., MIRE ATT&CK). The graph framework can be a knowledge graph, as illustrated in FIGS. 2 and 3. For example, the computer system may apply one or more AI models to map the data (block 408). Refer to FIG. 6 for further discussion about training the model. As another example, the computer system may apply one or more rules and/or algorithms to map the data (block 410). Refer to at least FIG. 1A and block B (132) in FIG. 1B for further discussion about mapping the data in the graph framework.

As part of mapping in block 406, the computer system can encode relationships between techniques and sub-techniques using an inheritance relationship (block 412). The computer system can encode relationships between techniques and sub-techniques using an implements relationship (block 414). The computer system can encode relationships between detections and techniques and/or sub-techniques (block 416). The computer system can encode preventions that mitigate specific techniques and/or sub-techniques (block 418). In other words, the computer system can encode relationships between the preventions and the specific techniques and/or sub-techniques that the respective preventions mitigate. Refer to at least FIG. 3 for further discussion about encoding the graph.

In block 420, the computer system can optionally encode implicit and/or hidden relationships according to the mapping and using topic modeling. Topic modeling can be integrated into the graph generation to extract additional relationships and structure from unstructured data, such as text data received from the prevention and/or detection systems. As a result, the topic modeling can be used to enhance extraction and utilization of knowledge from the unstructured data to provide a more rich and structured representation of information. Block 420 can be performed in scenarios where an incomplete mapping is generated in response to performing blocks 406-418, or where it can be challenging to map the complexity of both lateral and vertical movement (e.g., mapping laterally across preventions and detections, mapping up and down from preventions to high-level policies).

Optionally, the computer system can additionally or alternatively update and/or encode relationships according to the mapping and based on feedback from relevant users, such as security analysts (block 422). The security analysts may provide user input at their respective computing devices (e.g., the analyst computing device 104 in at least FIG. 1B and FIG. 7) indicating one or more connections, feedback, prevention measures, and/or detection measures. As an illustrative example, the security analysts can provide input indicating one or more other incomplete mappings, which can then be automatically combined by the computer system to generate a more complete mapping. The computer system can then, for example, traverse the graph and weight connections seen across the multiple mappings to strengthen those connections . The security analysts may provide feedback/user input in a postmortem or other structured process for analyzing and learning from incidents that have occurred. GUIs presented at the analysts' devices can include dashboards indicating the incidents, actions/controls/measures that were taken, and selectable options for the analysts to provide feedback. The feedback can include marking one or more of the incidents in the dashboards as false positives. The analysts can provide additional or other feedback using GUI features and input fields to verify whether false positives were in fact false and/or whether an event actually occurred.

The computer system can then traverse the graph in block 424. Traversing the graph can include navigating through the graph's nodes (e.g., the tactics, techniques, and sub-techniques) and the relationships (e.g., edges). The traversal can begin from a specific, identified node in the graph. To identify whether there is detection coverage for a specific tactic, the traversal can begin at a tactic node and then perform a query for child-of-that is a detection node. As another example, the traversal can include walking the graph from every prevention node and counting how many techniques are within two edges of the node. This traversal may indicate how much coverage there would be if the prevention function is implemented. In some implementations, the computer system may generate recommendations to prioritize the preventions that provide the most coverage.

The computer system can then automatically identify relationships associated with the current node and move to other nodes that are directly connected to the current node through the identified relationships. As the computer system continues traversal through the graph, it can build a network of interconnected tactics, techniques, and/or sub-techniques. In some implementations, graph analysis can be global, meaning the disclosed techniques can be run against every node/edge relationship in the graph. Other graph analysis may be related to walking the graph from a node to another node, then identifying the shortest path. In some implementations, the traversal can be stopped based on satisfaction of one or more termination criteria. Sometimes, the termination criteria can include but are not limited to reaching a predefined depth level, identifying specific types of nodes or relationships, fulfilling a user/security analyst-defined query, identification of a false positive, and/or if all relevant information has been exhausted.

Based on the traversal, the computer system can iteratively determine sufficiency of detection and/or prevention coverage (block 426). The computer system can perform a number of queries and/or algorithms in graph theory to further understand interconnectivity of detection and prevention nodes. For example, the queries and/or algorithms can include, but are not limited to, nearest neighbor, to identify similar prevention and/or detection nodes. Additionally or alternatively, the techniques may include disconnected subgraphs, which can be used to identify unused detections and/or preventions that may not correlate to anything in particular in the graph. Additionally or alternatively, community detection techniques can be performed to determine whether there is a large amount of connectedness between a subset of nodes in the graph. Additionally or alternatively, centrality techniques can be performed to determine importance and/or influence of a particular node on other nodes in the graph. Centrality techniques can further be used to determine which prevention and/or detection nodes may break up the graph the most if removed from the graph.

In other words, the computer system can identify gaps where prevention and/or detection measures may not be in place or may be improved. Such gaps can be identified as a result of missing connections between nodes in the graph, as one illustrative example. Determining the sufficiency of the detection and/or prevention coverage can be performed using ML and/or AI models. For example, ML models can be used to assess implicit connections between nodes in the graph and whether those are indicative of gaps in coverage. Refer to at least block D (136) in FIG. 1B for further discussion.

For example, the computer system can determine probability of chance (e.g., probability of distribution) that a malicious actor transitions between tactics in the graph (block 428). Refer to at least block E (138) in FIG. 1B and FIG. 5 for further discussion about determining the probability of chance.

The computer system can predict wherein the graph the malicious actor may end up based on the probability of chance (block 430). The computer system may use one or more ML and/or AI models to forecast attack sequences of the malicious actor according to the traversed graph and the probability of chance. As an illustrative example, a malicious actor can successfully change their credentials using a SQL injection attack. Their next technique can be to explore what other systems or services they can connect to in order to get deeper into the system. Accordingly, the disclosed computer system can use the ML and/or AI model(s) to forecast such an attack sequence of the malicious actor. As another illustrative example, suppose an adversary was able to create an account on a compromised machine - in other words, they were successful with persistence tactics. The model(s) described herein can provide a probability with which the adversary may next try to an access token manipulation technique for privilege escalation or defense evasion.

A predicted or forecasted evolution through the techniques and/or sub-techniques can indicate where the malicious actor is likely to end up in future attack sequences. Sometimes, the computer system can weight one or more of the techniques, sub-techniques, and/or tactics to forecast where the malicious actor may end up and/or which techniques and/or sub-techniques may be opportunities for improvement. Refer to at least block F (140) in FIG. 1B and FIG. 5 for further discussion.

The computer system can also generate counts between node connections to quantify detections and/or preventions for a corresponding technique and/or sub-techniques (block 432). The computer system may then apply one or more criteria to the counts to identify how many preventions and/or detections exist in the network security environment (e.g., each prevention or detection can receive a count value of 1) and thus qualitatively determine where there are sufficient preventions and/or detections and where there are insufficient preventions and/or detections.

In block 434, the computer system can identify opportunities for improving the detection and/or prevention measures based on the sufficiency of coverage, the probability of chance (e.g., probability of distribution), the prediction(s), or any combination thereof. Refer to at least block G (142) in FIG. 1B for further discussion. For example, the computer system can identify an opportunity for improvement of a particular detection and/or prevention having a count value that satisfies one or more improvement criteria (block 436). If the count value for prevention measures is less than a predetermined value, as a merely illustrative example, the computer system can determine that there is insufficient prevention measures against the particular malicious actor and/or the predicted attack sequence of the malicious actor. As yet another example, the computer system can identify 795 techniques in a particular network security framework, 45% detections coverage for those techniques, 47% preventions coverage for the techniques an overlap of detections and preventions for 263 of the 795 techniques, 96techniques having detections coverage but no preventions coverage, 115 techniques having preventions coverage but not detections coverage, and 320 techniques having no coverages. Based on such identifications, the computer system can prioritize the 320 techniques that have no coverages as an opportunity for improvement. In some implementations, the computer system may apply one or more prioritization criteria and/or weighting factors to prioritize techniques having one type of coverage (e.g., just detections or just preventions) but not the other type of coverage.

As another example, the computer system can weight count values for the detections and/or preventions in the graph using one or more predetermined weighting factors (block 438). For the example, the weighting factors may include recency of executing the preventions and/or detections. As another example, the weighting factors may include how often a particular detection and/or prevention rule triggers over some predetermined period of time.

Optionally, the computer system can rank the detections and/or the preventions using a prioritization criterion (block 440). The prioritization criterion can depend on a variety of factors, including but not limited to recency of execution, percentage or amount of coverage for one or more techniques, sub-techniques, and/or tactics, recency of development or updating, predicted/forecasted attack sequence(s), etc. In some implementations, the detections and/or preventions can be prioritized using multi-graph analysis. The multi-graph analysis can be used to identify preventions or detections that may come up in multiple different frameworks, thereby indicating a greater need to address or otherwise mitigate those identified preventions or detections in comparison to other preventions or detections that may not appear across different frameworks or appear les frequently. In some implementations, the detections and/or preventions can be assigned managed risk scores and/or detection scores based on graph analysis that is performed as described herein. The scores can then be used to rank and prioritize the detections and preventions. Refer above to at least blocks 434-436 for additional discussion about ranking the detections and the preventions.

The computer system can select a subset of the detections and/or the preventions having weighted count values that satisfy one or more improvement criteria (block 442). Where the preventions and detections are ranked, the computer system can select a quantity of the preventions and detections at a top of the ranking (e.g., a top 1, top 5, top 10, or other predetermined quantity of the top of the ranking). As another example, the computer system can select the preventions and/or detections that have corresponding count values greater than a predetermined threshold value or within a predetermined threshold range.

In one illustrative example, the one or more improvement criteria can indicate that weighted count values less than a predetermined threshold value is indicative of an area of improvement. The lower weighted count value can indicate that less than a desired amount of prevention or detection coverage exists. As another illustrative example, weighted count values that are greater than a predetermined threshold value can indicate that there is sufficient coverage associated with those weighted count values, but insufficient coverage (whether preventions, detections, or a combination thereof) of other coverages.

Accordingly, the computer system can then generate output indicating the opportunities for improvement in block 444. The output can include one or more GUIs or other visualizations of the opportunities for improvement. In some implementations, the output may include a heat map indicating coverage across different prevention and detection measures. Additionally or alternatively, the output may include a list (e.g., prioritized list) of prevention and/or detection measures that may need to be implemented, updated, and/or prioritized. Additionally or alternatively, the output may include information about operating system (OS) patches or specific software packages, package management updates, closing ports, upgrading encryption schemes, and/or configuration changes, any of which can be determined and/or recommended by the computer system and based on performing the disclosed techniques. Sometimes, any of the above information can be presented in the GUIs with selectable options to cause for execution of one or more actions/activities associated with the presented information (e.g., execution of an OS patch). Sometimes, any of the above information can be presented to indicate that the associated one or more actions/activities have been automatically executed (e.g., the computer system automated executed the OS patch without human intervention). Refer to at least block H (144) in FIG. 1B for further discussion.

In block 446, the computer system can return the output. Returning the output can include transmitting the output to computing devices of relevant users, such as security analysts. The computing devices can present the output in one or more respective graphical displays. As another example, returning the output can include storing the output in a data store or similar database. The stored output can later be retrieved and used for adjusting determinations of one or more opportunities for improvement, training any of the models described herein, and/or determining new opportunities for improvement. Refer to at least block I (146) in FIG. 1B for further discussion.

FIG. 5 is a flowchart of a process 500 for determining a probability of chance (e.g., probability of distribution) that a malicious actor may perform one or more attack sequences. The attack sequences can be generated automatically using probabilities as inputs. The probabilities can include a transition probability between tactics and/or an emission probability of techniques and/or sub-techniques from tactics. Various attack sequences can be automatically generated by expressing an order of occurrence and probabilities of tactics, techniques, and/or sub-techniques. By adjusting an order and probability of each tactic, technique, and/or sub-technique, the probability of chance (e.g., probability of occurrence) between the generated attack sequences can be compared for various purposes such as identifying an initial tactic, a specific attack inclusion or exclusion, etc. The transition probabilities can be used to determine an order of individual attacks that may constitute an attack sequence, which can vary based on adjusting the transition probabilities.

The process 500 can be performed by components of the security computer system 102 (e.g., a cybersecurity platform) that are described in reference to at least FIGS. 1A and 7. The process 500 can also be performed by one or more other software modules, applications, and/or engines that are programmed to perform the disclosed techniques. Such software modules, applications, and/or engines can be implemented by one or more computing systems, devices, computers, networks, cloud-based systems, and/or cloud-based services. For illustrative purposes, the process 500 is described from the perspective of a computer system.

Referring to the process 500 in FIG. 5, the computer system can receive data about network security events in block 502. For example, the computer system can receive data associated with a particular malicious actor in block 504. As another example, the computer system can receive data associated with a particular network in block 506. The data can be retrieved from a data store described herein. The data can be retrieved from a preventions system, a detection system, user computing devices, and/or analyst computing devices, as described herein. In some implementations, the data received in block 502 can be the same as or otherwise include portions of the data received and described in reference to block 402 in the process 400 of FIGS. 4A and 4B.

The computer system can determine a frequency of transition between each tactic and frequency of observed technique or sub-technique according to the tactic as a probability (block 508). Accordingly, the computer system can determine a frequency of transition between tactics as a probability (block 510). The computer system can additionally or alternatively determine a frequency of transition between techniques and/or sub-techniques as a probability (block 512). In other words, the computer system can automatically calculate a frequency of transition between each tactic and a frequency of observed techniques and/or sub-techniques to each tactic. Such frequencies can be calculated as probability values. It can be assumed that a tactic used by the malicious actor at a first time can only be affected by a tactic used by the malicious actor at a time that is before the first time (e.g., Markovian property). It can also be assumed that a technique observed at the first time may be affects only by a tactic at the first time.

In block 514, the computer system may aggregate the probabilities. The probabilities may include likelihood of a malicious actor moving from one technique to another technique.

Optionally the computer system may weight the probabilities (block 516). The weighting can vary based on industry. Some industries may be more prone to some attacks versus others, which can result in the probabilities being weighted differently. As an illustrative example, denial of service attacks (DoS) can be weight or prioritized more than privilege escalation in some industries.

The computer system can derive, from the probabilities (e.g., the aggregated probabilities, the weighted probabilities, the aggregated and weighted probabilities), an initial probability, a transition probability, and/or an emission probability (block 518). The initial probability can indicate a probability that the malicious actor would start each tactic or start one or more tactics. The transition probability can indicate a probability of movement between tactics by the malicious actor. The emission probability can indicate a probability of occurrence of a technique or sub-technique in each tactic.

Accordingly, the computer system can return information about the derived probabilities in block 520. For example, the derived probabilities may be used by the computer system to generate and return one or more attack sequences (block 522). As another example, the derived probabilities may be used by the computer system to predict and return one or more attack sequences (block 524). One or more of the probabilities can be adjusted using one or more adjustment criteria to create attack sequences that reflect on a purpose of the malicious actor, such as which tactic to start from and/or which tactic and/or technique to be included in the attack sequence(s). Furthermore, the probabilities can be used to generate sets of different attack sequences, which can be arranged by different techniques, sub-techniques, and/or tactics.

Refer to at least the process 400 in FIGS. 4A and 4B for further discussion about how the derived probabilities can be used by the computer system to identify opportunities for improvement in prevention and/or detection measures.

FIG. 6 is a flowchart of a process 600 for training an AI model to map information related to network security event detection and prevention measures to a graph, such as a knowledge graph. The process 600 can be performed by components of the security computer system 102 (e.g., a cybersecurity platform) that are described in reference to at least FIGS. 1A and 7. The process 600 can also be performed by one or more other software modules, applications, and/or engines that are programmed to perform the disclosed techniques. Such software modules, applications, and/or engines can be implemented by one or more computing systems, devices, computers, networks, cloud-based systems, and/or cloud-based services. For illustrative purposes, the process 600 is described from the perspective of a computer system.

Referring to the process 600 in FIG. 6, the computer system can retrieve existing associations and relationships information amongst tactics, techniques, sub-techniques, detections, and/or preventions (block 602). These associations and relationships can be determined by the computer system, such as being part of generating a knowledge graph using the process 400 of FIG. 4. Additionally or alternatively, the associations and relationships can be identified by relevant users, such as security analysts, in user input provided at their respective computing devices. In some implementations, the associations and/or relationships information can be generated by a network security framework, according to a security framework taxonomy. Refer to at least FIG. 1A for further discussion about the framework taxonomy.

In block 604, the computer system can retrieve network security data. The network security data can be used by the computer system to identify how malicious actor activities may have changed over time. Sometimes, the computer system can retrieve the network security data corresponding to a predetermined time period (e.g., a current time, a past 24 hours, a past 72 hours, a past week, a past month). The network security data can be retrieved from the computer system local memory, from a data store, from analyst computing devices, from user computing devices in a particular user network, or any other computing devices associated with a network security environment.

The computer system can process the network security data to identify contextual information for generating associations and/or relationships in block 606. The computer system can use text analysis techniques in some implementations to extract relevant information for the associations and/or relationships.

Accordingly, the computer system can train an AI mapping model using the existing associations and the contextual information (block 608). For example, the computer system can train the model to generate a probabilistic distribution indicating potential associations and/or relationships (block 610). During runtime, the probabilistic distribution can then be used (such as by the computer system) to determine whether an association or relationship is likely between one or more tactics, techniques, sub-techniques, detections, and/or preventions. As another example, the computer system can train the model to generate the associations and/or relationships (block 612). As a result, the model can be used to generate a mapping of the tactics, techniques, sub-techniques, detections, and preventions in a graph framework as described herein.

In block 614, the computer system can return the trained model. Returning the trained model can include storing the model for later retrieval and use during runtime (e.g., to generate a graph framework as described in reference to at least the process 400 in FIGS. 4A and 4B). The model can be stored in a data store and/or local memory of the computer system.

In bock 616, the computer system can optionally iteratively train and improve the model. For example, the model can be trained at predetermined time intervals (e.g., once a day, once every 3 days, once a week, once a month). As another example, the model can be trained in response to receiving feedback or other user input from analyst computing devices. Iteratively training the model can improve the model's accuracy in determining associations and/or relationships. Iteratively training the model can also improve the model's accuracy in generating the probabilistic values or distributions indicating potential associations and/or relationships.

Sometimes, the process 600 may end in response to performing block 614.

FIG. 7 is a system diagram of one or more components that can be used to perform the disclosed technology. As shown and described herein, the security computer system 102 (e.g., a cybersecurity platform) can communicate (e.g., wired, wireless) via the communication network(s) 110 with the end user devices 108A-N, the analyst computing devices 104A-N, the data store 106, user network(s) 714 (where the user network(s) 714 may be made up of one or more of the end user devices 108A-N and/or the third party system(s) 111), the third party system(s) 111, and/or the network security framework 113. Refer to at least FIGS. 1A and 1B for further discussion about the security computer system 102, the end user devices 108A-N, the analyst computing devices 104A-N, the data store 106, the third party system(s) 111, and the network security framework 113.

The security computer system 102 can include the prevention system 112, the detection system 114, other security measure systems 701, a data aggregation system 702, the mapping engine 116, the gap detection engine 118, an output generator 710, a model training engine 711, and a communication interface 712. In brief, the communication interface 712 can be configured to provide network communication between the components of the security computer system 102 and the other system components shown and described in reference to FIG. 7.

The prevention system 112, as described in at least FIG. 1A, can be programmed and configured to provide and/or execute one or more security measures and/or controls in a network security environment for the user network(s) 714. For example, prevention measures can be provided by the prevention system 112 to the third party system(s) 111 for execution in the network security environment. The prevention measures can include settings, configurations, and/or firewalls, which can be executed at the third party system(s) 111 to configure and prevent malicious attacks or other vulnerabilities from occurring within the user network(s) 714, at the third party system(s) 111, and/or at any of the end user devices 108A-N.

The detection system 114, as described in at least FIG. 1A, can be programmed and configured to provide and/or execute one or more blocking measures and/or controls in the network security environment to block malicious attacks, vulnerabilities, or other security events that may be detected in the user network(s) 714, at the third party system(s) 111, and/or at any of the end user devices 108A-N. The detection system 114 can, for example, generate rules that can be triggered by at least the third party system(s) 111 to block the malicious attacks or vulnerabilities. As a result of blocking such activity, triggers can be transmitted to the security computer system 102 for further processing.

The other security measure systems 701 can be any other types of systems programmed and configured to operate in the network security environment to respond to malicious actors and/or security events in the monitored user network(s) 714. As a merely illustrative example, the other security measure systems 701 can include a recovery and/or remediation system, which can be programmed and configured to execute recovery/remediation measures in response to the detection of the malicious actors and/or the security events in the user network(s) 714.

The data aggregation system 702 can be programmed and configured to poll the prevention system 112, the detection system 114, and/or the other security measure systems 701 for data corresponding to the respective executed measures, as described at least in reference to block 402 in the process 400 of FIGS. 4A and 4B. The data aggregation engine 702 can further be programmed to aggregate and process the polled/received data, thereby making such unstructured data more readable/understandable for purposes of generating a knowledge graph. The data aggregation engine 702 may execute one or more text analysis techniques to identify text data in the polled/received data that can then be used for generating the knowledge graph. Various other techniques can be performed to extract contextual data/information from the polled/received data, which can then be used to perform the disclosed techniques.

The mapping engine 116 can include a graph traversal engine 704. Refer to at least FIG. 1A for further discussion about the mapping engine 116. For example, the mapping engine 116 can be programmed to receive the processed data from the data aggregation system 702 and map the data to a graph framework as described herein. The processed data can include, as illustrative examples, configurations made at the third party system(s) 111 according to information provided by the prevention system 112 to the third party system(s) 111 and/or rule triggers from the third party system(s) according to the rules provided by the detection system 114 to the third party system(s) 111. The engine 116 may be configured to apply one or more trained AI and/or ML models to generate the mapping in the graph framework. Refer to at least the process 400 in FIGS. 4A and 4B for further discussion about generating the mapping. The mapping engine 116 can also receive a framework taxonomy or other network security schema from the network security framework 113. This taxonomy can provide an inherent mapping and organization of different attack, attack types, and/or attack sequences according to tactics, techniques, and/or sub-techniques. The mapping engine 116 can then use the taxonomy to map the data from the prevention system 112, the detection system 114, and/or the other security measure system(s) 701 in a knowledge graph or other type of graph described herein.

The graph traversal engine 704 can be programmed and configured to automatically traverse the graph that was generated by the mapping engine 116. Refer to at least the process 400 in FIGS. 4A and 4B for further discussion about the traversal.

The gap detection engine 118, as described in reference to at least FIG. 1A, can be programmed and configured to identify gaps between preventions, detections, and other security measures in relation to particular tactics, techniques, and/or sub-techniques in a network security framework and/or for one or more malicious actors. Identification of the gaps can be based on the graph traversal performed by the graph traversal engine 704. The engine 118 can also be programmed and configured to predict or forecast likely attack sequences of malicious actors using the mapping. Refer to FIGS. 2 and 3 for further discussion about the graph and traversing the graph.

The gap detection engine 118 can include a coverage sufficiency engine 706 and/or a probability of chance determination engine 708. The coverage sufficiency engine 706 can be programmed and configured to determine sufficiency of one or more preventions, detections, or other measures based on the graph traversal. Refer to at least the process 400 in FIGS. 4A and 4B for further discussion about determining the coverage sufficiency. The probability of chance determination engine 708 can be programmed and configured to determine probabilities and predictions of actions the malicious actors may take. The engine 708 can therefore determine likelihoods that the malicious actors would transition between different tactics, techniques, and/or sub-techniques.

Refer to at least the process 500 in FIG. 5 for further discussion about the probability of chance determination engine 708.

The output generator 710 can be programmed and configured to generate output about determinations made by at least the gap detection engine 118, the coverage sufficiency engine 706, and/or the probability of chance determination engine 708. Refer to at least FIGS. 1B, 4A, and 4B for further discussion about the output. The output generator 710 may also transmit the generated output to any relevant analyst computing devices 104A-N, as described herein.

The model training engine 711 can be programmed and configured to generate, train, and iteratively improve any of the models described herein. Refer to at least the process 600 in FIG. 6 for further discussion about techniques performed by the model training engine 711.

The components of the security computer system 102 are illustrative examples. In some implementations, the security computer system 102 can include additional, other, or fewer components that are programmed and configured to perform the disclosed techniques. Sometimes, one or more of the components shown and described in FIG. 7 can be independent or otherwise separate from the security computer system 102. For example, the prevention system 112, the detection system 114, and the other security measure system(s) 701 can be independent, separate systems in network communication via the communication network(s) with each other and/or components of the security computer system 102. As another illustrative example, the coverage sufficiency engine 706 and the probability of chance determination engine 708 can be engines that are separate from the gap detection engine 118. Various other implementations are also possible.

Figure 8:
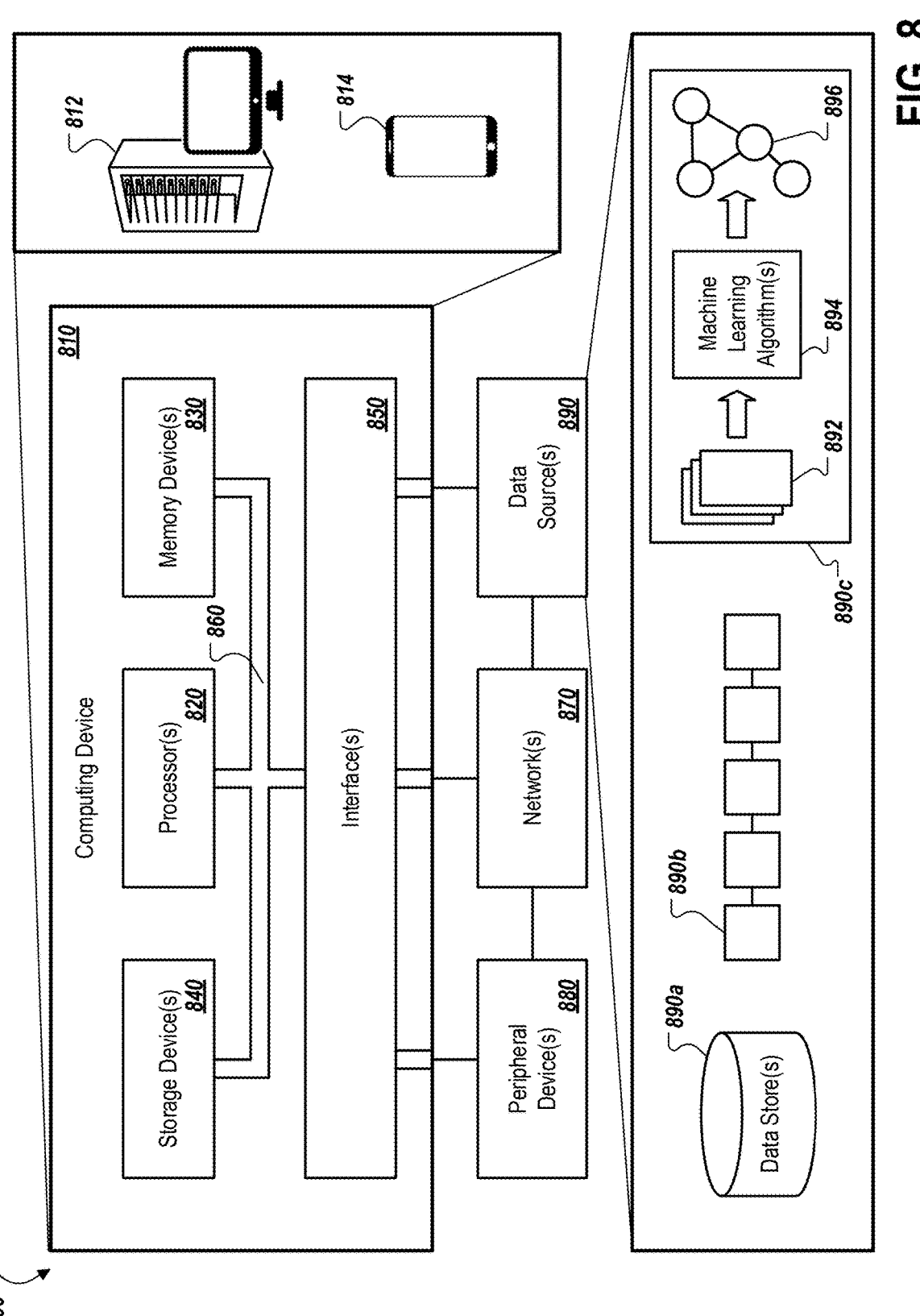
FIG. 8 is a schematic diagram that shows an example of a computing device and a mobile computing device.

FIG. 8 is a schematic diagram that shows an example of a computing system 800 that can be used to implement the techniques described herein. More specifically, the computing system 800 shown in FIG. 8 comprises devices that can be specifically programmed to perform the techniques described herein. The computing system 800 includes one or more computing devices (e.g., computing device 810), which can be in wired and/or wireless communication with various peripheral device(s) 880, data source(s) 890, and/or other computing devices (e.g., over network(s) 870). The computing device 810 can represent various forms of stationary computers 812 (e.g., workstations, kiosks, servers, mainframes, edge computing devices, quantum computers, etc.) and mobile computers 814 (e.g., laptops, tablets, mobile phones, personal digital assistants, wearable devices, etc.). In some implementations, the computing device 810 can be included in (and/or in communication with) various other sorts of devices, such as data collection devices (e.g., devices that are configured to collect data from a physical environment, such as microphones, cameras, scanners, sensors, etc.), robotic devices (e.g., devices that are configured to physically interact with objects in a physical environment, such as manufacturing devices, maintenance devices, object handling devices, etc.), vehicles (e.g., devices that are configured to move throughout a physical environment, such as automated guided vehicles, manually operated vehicles, etc.), or other such devices. Each of the devices (e.g., stationary computers, mobile computers, and/or other devices) can include components of the computing device 810, and an entire system can be made up of multiple devices communicating with each other. For example, the computing device 810 can be part of a computing system that includes a network of computing devices, such as a cloud-based computing system, a computing system in an internal network, or a computing system in another sort of shared network. Processors of the computing device (810) and other computing devices of a computing system can be optimized for different types of operations, secure computing tasks, etc. The components shown herein, and their functions, are meant to be examples, and are not meant to limit implementations of the technology described and/or claimed in this document.

The computing device 810 includes processor(s) 820, memory device(s) 830, storage device(s) 840, and interface(s) 850. Each of the processor(s) 820, the memory device(s) 830, the storage device(s) 840, and the interface(s) 850 are interconnected using a system bus 860. The processor(s) 820 are capable of processing instructions for execution within the computing device 810, and can include one or more single-threaded and/or multi-threaded processors. The processor(s) 820 are capable of processing instructions stored in the memory device(s) 830 and/or on the storage device(s) 840. The memory device(s) 830 can store data within the computing device 810, and can include one or more computer-readable media, volatile memory units, and/or non-volatile memory units. The storage device(s) 840 can provide mass storage for the computing device 810, can include various computer-readable media (e.g., a floppy disk device, a hard disk device, a tape device, an optical disk device, a flash memory or other similar solid state memory device, or an array of devices, including devices in a storage area network or other configurations), and can provide date security/encryption capabilities.

The interface(s) 850 can include various communications interfaces (e.g., USB, Near-Field Communication (NFC), Bluetooth, WiFi, Ethernet, wireless Ethernet, etc.) that can be coupled to the network(s) 870, peripheral device(s) 880, and/or data source(s) 890 (e.g., through a communications port, a network adapter, etc.). Communication can be provided under various modes or protocols for wired and/or wireless communication. Such communication can occur, for example, through a transceiver using a radio-frequency. As another example, communication can occur using light (e.g., laser, infrared, etc.) to transmit data. As another example, short-range communication can occur, such as using Bluetooth, WiFi, or other such transceiver. In addition, a GPS (Global Positioning System) receiver module can provide location-related wireless data, which can be used as appropriate by device applications. The interface(s) 850 can include a control interface that receives commands from an input device (e.g., operated by a user) and converts the commands for submission to the processors 820. The interface(s) 850 can include a display interface that includes circuitry for driving a display to present visual information to a user. The interface(s) 850 can include an audio codec which can receive sound signals (e.g., spoken information from a user) and convert it to usable digital data. The audio codec can likewise generate audible sound, such as through an audio speaker. Such sound can include real-time voice communications, recorded sound (e.g., voice messages, music files, etc.), and/or sound generated by device applications.

The network(s) 870 can include one or more wired and/or wireless communications networks, including various public and/or private networks. Examples of communication networks include a LAN (local area network), a WAN (wide area network), and/or the Internet. The communication networks can include a group of nodes (e.g., computing devices) that are configured to exchange data (e.g., analog messages, digital messages, etc.), through telecommunications links. The telecommunications links can use various techniques (e.g., circuit switching, message switching, packet switching, etc.) to send the data and other signals from an originating node to a destination node. In some implementations, the computing device 810 can communicate with the peripheral device(s) 880, the data source(s) 890, and/or other computing devices over the network(s) 870. In some implementations, the computing device 810 can directly communicate with the peripheral device(s) 880, the data source(s), and/or other computing devices.

The peripheral device(s) 880 can provide input/output operations for the computing device 810. Input devices (e.g., keyboards, pointing devices, touchscreens, microphones, cameras, scanners, sensors, etc.) can provide input to the computing device 810 (e.g., user input and/or other input from a physical environment). Output devices (e.g., display units such as display screens or projection devices for displaying graphical user interfaces (GUIs)), audio speakers for generating sound, tactile feedback devices, printers, motors, hardware control devices, etc.) can provide output from the computing device 810 (e.g., user-directed output and/or other output that results in actions being performed in a physical environment). Other kinds of devices can be used to provide for interactions between users and devices. For example, input from a user can be received in any form, including visual, auditory, or tactile input, and feedback provided to the user can be any form of sensory feedback (e.g., visual feedback, auditory feedback, or tactile feedback).

The data source(s) 890 can provide data for use by the computing device 810, and/or can maintain data that has been generated by the computing device 810 and/or other devices (e.g., data collected from sensor devices, data aggregated from various different data repositories, etc.). In some implementations, one or more data sources can be hosted by the computing device 810 (e.g., using the storage device(s) 840). In some implementations, one or more data sources can be hosted by a different computing device. Data can be provided by the data source(s) 890 in response to a request for data from the computing device 810 and/or can be provided without such a request. For example, a pull technology can be used in which the provision of data is driven by device requests, and/or a push technology can be used in which the provision of data occurs as the data becomes available (e.g., real-time data streaming and/or notifications). Various sorts of data sources can be used to implement the techniques described herein, alone or in combination.

In some implementations, a data source can include one or more data store(s) 890*a*. The database(s) can be provided by a single computing device or network (e.g., on a file system of a server device) or provided by multiple distributed computing devices or networks (e.g., hosted by a computer cluster, hosted in cloud storage, etc.). In some implementations, a database management system (DBMS) can be included to provide access to data contained in the database(s) (e.g., through the use of a query language and/or application programming interfaces (APIs)). The database(s), for example, can include relational databases, object databases, structured document databases, unstructured document databases, graph databases, and other appropriate types of databases.

In some implementations, a data source can include one or more blockchains 890*b*. A blockchain can be a distributed ledger that includes blocks of records that are securely linked by cryptographic hashes. Each block of records includes a cryptographic hash of the previous block, and transaction data for transactions that occurred during a time period. The blockchain can be hosted by a peer-to-peer computer network that includes a group of nodes (e.g., computing devices) that collectively implement a consensus algorithm protocol to validate new transaction blocks and to add the validated transaction blocks to the blockchain. By storing data across the peer-to-peer computer network, for example, the blockchain can maintain data quality (e.g., through data replication) and can improve data trust (e.g., by reducing or eliminating central data control).

In some implementations, a data source can include one or more machine learning systems 890c. The machine learning system(s) 890c, for example, can be used to analyze data from various sources (e.g., data provided by the computing device 810, data from the data store(s) 890a, data from the blockchain(s) 890b, and/or data from other data sources), to identify patterns in the data, and to draw inferences from the data patterns. In general, training data 892 can be provided to one or more machine learning algorithms 894, and the machine learning algorithm(s) can generate a machine learning model 896. Execution of the machine learning algorithm(s) can be performed by the computing device 810, or another appropriate device. Various machine learning approaches can be used to generate machine learning models, such as supervised learning (e.g., in which a model is generated from training data that includes both the inputs and the desired outputs), unsupervised learning (e.g., in which a model is generated from training data that includes only the inputs), reinforcement learning (e.g., in which the machine learning algorithm(s) interact with a dynamic environment and are provided with feedback during a training process), or another appropriate approach. A variety of different types of machine learning techniques can be employed, including but not limited to convolutional neural networks (CNNs), deep neural networks (DNNs), recurrent neural networks (RNNs), and other types of multi-layer neural networks.

Various implementations of the systems and techniques described herein can be realized in digital electronic circuitry, integrated circuitry, specially designed ASICs (application specific integrated circuits), computer hardware, firmware, software, and/or combinations thereof. A computer program product can be tangibly embodied in an information carrier (e.g., in a machine-readable storage device), for execution by a programmable processor. Various computer operations (e.g., methods described in this document) can be performed by a programmable processor executing a program of instructions to perform functions of the described implementations by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, by a computer to perform a certain activity or bring about a certain result. A computer program can be written in any form of programming language, including compiled or interpreted languages, and can be deployed in any form, including as a stand-alone program or as a module, component, subroutine, or other unit suitable for use in a computing environment. A computer program product can be a computer-or machine-readable medium, such as a storage device or memory device. As used herein, the terms machine-readable medium and computer-readable medium refer to any computer program product, apparatus and/or device (e.g., magnetic discs, optical disks, memory, etc.) used to provide machine instructions and/or data to a programmable processor, including a machine-readable medium that receives machine instructions as a machine-readable signal. The term machine-readable signal refers to any signal used to provide machine instructions and/or data to a programmable processor.

Suitable processors for the execution of a program of instructions include, by way of example, both general and special purpose microprocessors, and can be a single processor or one of multiple processors of any kind of computer. Generally, a processor will receive instructions and data from a read-only memory or a random access memory or both. The elements of a computer are a processor for executing instructions and one or more memory devices for storing instructions and data. Generally, a computer can also include, or can be operatively coupled to communicate with, one or more mass storage devices for storing data files. Such devices can include magnetic disks (e.g., internal hard disks and/or removable disks), magneto-optical disks, and optical disks. Storage devices suitable for tangibly embodying computer program instructions and data can include all forms of non-volatile memory, including by way of example semiconductor memory devices, flash memory devices, magnetic disks (e.g., internal hard disks and removable disks), magneto-optical disks, and optical disks. The processor and the memory can be supplemented by, or incorporated in, ASICs (application-specific integrated circuits).

The systems and techniques described herein can be implemented in a computing system that includes a back end component (e.g., a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). The computer system can include clients and servers, which can be generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A system for detecting gaps in cybersecurity measures performed in a network security environment, the system comprising:

a cybersecurity prevention system comprising one or more processors and memory storing instructions that, when executed, cause the one or more processors to generate and provide prevention measures to a third party system in a network security environment, wherein the prevention measures comprise configuration settings that, when implemented at the third party system, cause the third party system to prevent potential cybersecurity vulnerabilities;

a cybersecurity detection system comprising one or more processors and memory storing instructions that, when executed, cause the one or more processors to generate and provide detection measures to the third party system in the network security environment, wherein the detection measures comprise rules that are triggered, by the third party system, in response to detecting and blocking the potential cybersecurity vulnerabilities;

a mapping engine comprising one or more processors and memory storing instructions that, when executed, cause the one or more processors to:

receive prevention data from the cybersecurity prevention system;

receive detection data from the cybersecurity detection system;

receive a framework taxonomy from a cybersecurity framework, wherein the framework taxonomy comprises relationships between cybersecurity vulnerabilities, tactics, techniques, and sub-techniques; and generate a knowledge graph based on mapping the prevention data, the detection data, and the tactics, techniques, and sub-techniques of the framework taxonomy; and a gap detection engine comprising one or more processors and memory storing instructions that, when executed, cause the one or more processors to:

receive the knowledge graph from the mapping engine;

traverse the knowledge graph;

iteratively detect gaps in the prevention measures or the detection measures based on traversing the knowledge graph, wherein iteratively detecting the gaps comprises generating weighted count values for connections between nodes in the knowledge graph and based on the traversing;

rank the detection measures and the prevention measures according to the weighted count values;

select a subset of the ranked detection measures and prevention measures having the weighted count values that satisfy one or more improvement criteria; and return information about the selected subset of the ranked detection measures and prevention measures as opportunities for improvement.

2. The system of claim 1, wherein generating the knowledge graph is further based on applying a trained artificial intelligence (AI) model to the prevention data, the detection data, and the framework taxonomy, wherein the AI model was trained to correlate the prevention data and the detection data with the tactics, techniques, and sub-techniques according to the framework taxonomy.

3. The system of claim 1, wherein detecting the gaps is further based on applying a trained AI model to the knowledge graph.

4. The system of claim 1, wherein detecting the gaps comprises determining a sufficiency of coverage for the prevention measures or the detection measures against the potential cybersecurity vulnerabilities.

5. The system of claim 4, wherein determining the sufficiency of coverage comprises generating the weighted count values to quantify the detection measures and the prevention measures for the corresponding techniques or sub-techniques, wherein the nodes in the knowledge graph indicate the tactics, techniques, and the sub-techniques.

6. The system of claim 1, wherein the gap detection engine is further programmed to identify a particular prevention measure or a particular detection measure for improvement based on the respective weighted count value satisfying one or more improvement criteria.

7. The system of claim 1, wherein the weighted count values are weighted based on one or more predetermined weighting factors.

8. The system of claim 1, wherein detecting the gaps comprises determining a probability of chance that a malicious actor would transition between the tactics, techniques, or sub-techniques of the knowledge graph.

9. The system of claim 8, wherein the gap detection engine is further programmed to predict where, in the knowledge graph, the malicious actor is likely to end up based on the probability of chance.

10. The system of claim 1, wherein returning the information about the detected gaps comprises identifying an opportunity for improving at least one of the prevention measures or the detection measures corresponding to the detected gaps that satisfy one or more improvement criteria.

11. The system of claim 1, wherein generating the knowledge graph comprises encoding relationships between the detection measures and the techniques or the sub-techniques.

12. The system of claim 1, wherein generating the knowledge graph comprises encoding relationships between the prevention measures and the techniques or the sub-techniques that the respective prevention measures mitigate.

13. The system of claim 1, wherein traversing the knowledge graph comprises:

selecting a starting node in the knowledge graph; and recursively traversing through edges of the knowledge graph between nodes, wherein the traversal begins at the starting node.

* * * * *